United States Patent
Fujishima et al.

(10) Patent No.: US 7,453,854 B2
(45) Date of Patent: Nov. 18, 2008

(54) RADIO SIGNAL COMMUNICATION METHOD, BASE STATION AND TERMINAL STATION

(75) Inventors: Kenzaburo Fujishima, Kokubunji (JP); Mikio Kuwahara, Hachioji (JP)

(73) Assignees: Hitachi, Ltd., Tokyo (JP); Hitachi Communication Technologies, Ltd., Tokyo (JP)

( * ) Notice: Subject to any disclaimer, the term of this patent is extended or adjusted under 35 U.S.C. 154(b) by 621 days.

(21) Appl. No.: 10/847,629

(22) Filed: May 18, 2004

(65) Prior Publication Data
US 2004/0235472 A1 Nov. 25, 2004

(30) Foreign Application Priority Data
May 20, 2003 (JP) .............................. 2003-141288
Apr. 12, 2004 (JP) .............................. 2004-116333

(51) Int. Cl.
*H04B 7/216* (2006.01)
(52) U.S. Cl. ....................... 370/335; 370/328; 370/329; 370/330; 370/331; 370/332; 370/334; 370/338; 455/101; 455/435.2; 455/436; 455/437; 455/438; 455/439; 455/442; 455/443; 455/444; 455/450; 455/451; 455/452.1; 455/452.2; 455/550.1; 455/552.1
(58) Field of Classification Search ................. 370/335, 370/328, 329, 330, 331, 332, 334, 338; 455/435.2, 455/436–444, 450–452.2, 550.1–552.2, 101
See application file for complete search history.

(56) References Cited

U.S. PATENT DOCUMENTS 5,771,468 A * 6/1998 Stein .......................... 455/561
5,894,473 A * 4/1999 Dent .......................... 370/342
6,067,290 A * 5/2000 Paulraj et al. ............... 370/329
6,289,221 B1 * 9/2001 Ritter ......................... 455/447

(Continued)

FOREIGN PATENT DOCUMENTS

CN           1389039           8/2001

(Continued)

OTHER PUBLICATIONS

Office Action from the China Patent Office dated May 23, 2008.

(Continued)

*Primary Examiner*—Stephen M D'Agosta
(74) *Attorney, Agent, or Firm*—Reed Smith LLP; Stanley P. Fisher, Esq.; Juan Carlos A. Marquez, Esq.

(57) ABSTRACT

A signal transmission and reception method, and a base station and a mobile terminal therefor are disclosed. In a communication system including a base station and at least a mobile terminal, the transmission of the data signal from the base station to each mobile terminal is controlled in accordance with the manner in which the pilot signal transmitted from the base station to each mobile terminal is received by the mobile terminal. In the signal transmission method, the proper one of a plurality of signal multiplexing schemes is selected based on the control signal received from each mobile terminal, and the transmission signal is multiplexed by the selected signal multiplexing scheme and transmitted to each mobile terminal. The transmission signal includes the data signal and the dedicated pilot signal transmitted to the mobile terminal.

14 Claims, 13 Drawing Sheets

U.S. PATENT DOCUMENTS

| | | | | |
|---|---|---|---|---|
| 6,967,937 B1 | * | 11/2005 | Gormley | 370/330 |
| 7,043,270 B2 | * | 5/2006 | Judd et al. | 455/561 |
| 7,146,186 B1 | * | 12/2006 | Moon et al. | 455/552.1 |
| 2003/0119550 A1 | * | 6/2003 | Rinne et al. | 455/553 |

FOREIGN PATENT DOCUMENTS

| | | | |
|---|---|---|---|
| WO | WO 99/23844 | * | 5/1999 |

OTHER PUBLICATIONS

Hiroyuki Atarashi et al., "Broadband Packet Wireless Access Appropriate for High-speed and High-capacity Throughput", 2001, IEEE, pp. 566-567.

Vadim V. Cherkosov et al., "Communication Links Multiplexing Methods Efficiency and Onboard Antenna Gain from Influence on Low Earth Orbit communication Networks Throughput", The 2nd International Conference on Satellite Communications, Sep. 23-27, 1996, Proceedings of ICSC '96, vol. III, cover page and p. 5.

* cited by examiner

FIG. 6

PROPAGATION PATH INFORMATION RECORDING TABLE

| TERMINAL ID | PROPAGATION PATH CONDITION |
|---|---|
| A | 4 |
| B | 3 |
| C | 4 |
| D | 7 |

FIG. 7

| TERMINAL ID | DEDICATED CH ID | FREQUENCY RESOURCE | | |
|---|---|---|---|---|
| | | CODE | SPACE | TIME |
| A | 1 | PN:512 Walsh:1 | 69 deg | Div1/2 |
| B | 1 | PN:512 Walsh:1 | 70 deg | Div2/2 |
| C | 2 | PN:512 Walsh:2 | 71 deg | All |
| D | 2 | PN:512 Walsh:2 | 180 deg | All |

RESOURCE ASSIGN TABLE

UPLINK CONTROL SIGNAL TRANSMITTED
FROM TERMINAL TO BASE STATION 1000

FIG. 14A

SPACE DOMAIN PROXIMITY TABLE

| TERMINAL ID | TERMINAL ID PROHIBITED FROM SAME TIME-CODE ASSIGNMENT |
|---|---|
| A | B,C |
| B | A,C |
| C | A,B |
| D | NONE |

FIG. 14B

SPACE DOMAIN PROXIMITY TABLE

| TERMINAL ID | TERMINAL PROHIBITED FROM SAME TIME-CODE ASSIGNMENT |
|---|---|
| A | NONE |
| B | NONE |
| C | D |
| D | C |

FIG. 15A

PROPAGATION PATH INFORMATION RECORDING TABLE

| TERMINAL ID | PROPAGATION PATH CONDITION |
|---|---|
| A | 4 |
| B | 3 |
| C | 4 |
| D | 7 |

FIG. 15B

PROPAGATION PATH INFORMATION RECORDING TABLE

| TERMINAL ID | PROPAGATION PATH CONDITION |
|---|---|
| A | 7 |
| B | 7 |
| C | 4 |
| D | 4 |

FIG. 16A

RESOURCE ASSIGN TABLE

| TERMINAL ID | DEDICATED CH ID | FREQUENCY RESOURCE | | |
|---|---|---|---|---|
| | | CODE | SPACE | TIME |
| A | 1 | PN:512 Walsh:1 | 69 deg | Div1/2 |
| B | 1 | PN:512 Walsh:1 | 70 deg | Div2/2 |
| C | 2 | PN:512 Walsh:2 | 71 deg | All |
| D | 2 | PN:512 Walsh:2 | 180 deg | All |

FIG. 16B

RESOURCE ASSIGN TABLE

| TERMINAL ID | DEDICATED CH ID | FREQUENCY RESOURCE | | |
|---|---|---|---|---|
| | | CODE | SPACE | TIME |
| A | 1 | PN:512 Walsh:1 | 69 deg | All |
| B | 1 | PN:512 Walsh:1 | 105 deg | All |
| C | 2 | PN:512 Walsh:2 | 176 deg | Div1/2 |
| D | 2 | PN:512 Walsh:2 | 180 deg | Div2/2 |

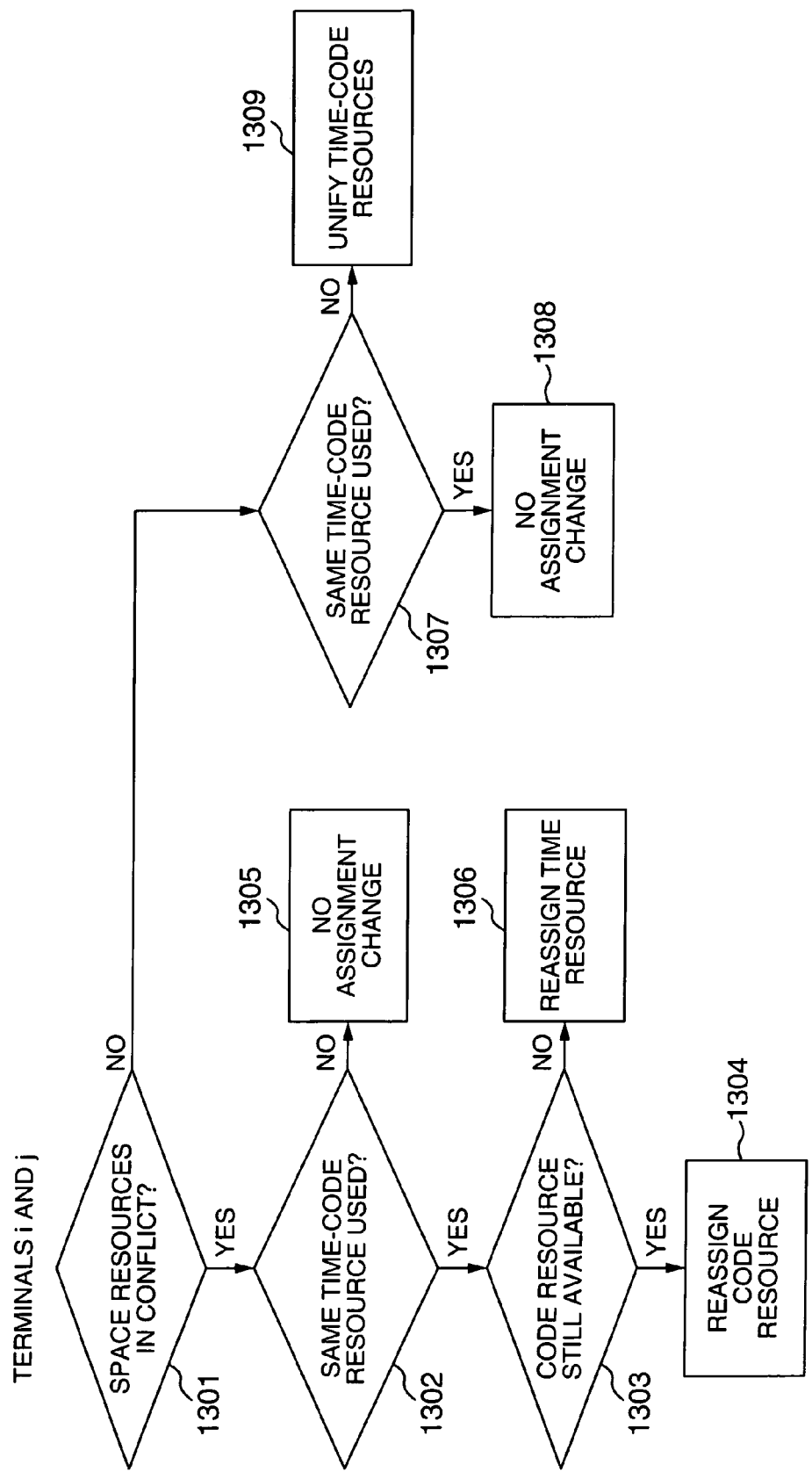

RADIO SIGNAL COMMUNICATION METHOD, BASE STATION AND TERMINAL STATION

INCORPORATION BY REFERENCE

The present application claims priorities from Japanese applications JP2003-141288 filed on May 20, 2003, and JP2004-116333 filed on Apr. 12, 2004, the contents of which are hereby incorporated by reference into this application.

BACKGROUND OF THE INVENTION

The present invention relates to a pilot signal transmission and reception method and a base station and a mobile terminal of a data communication system with a variable data rate in which the packet data transmission rate is increased and the transmission delay is reduced.

WO99/23844 discloses a method and an apparatus for increasing the packet data transmission rate and reducing the transmission delay in a data communication system with a variable data rate.

Consider the pilot signal in the prior art. The pilot signal is used for various purposes. The first purpose is to detect a base station which controls a mobile terminal. The second purpose is for a mobile terminal to receive a pilot signal from at least one base station, estimate SINR (signal-to-interference plus noise ratio) which is a reception level ratio between the pilot signal of a desired base station and the pilot signals of the other base stations, and calculate the data transmission rate allowable in a downlink by the SINR value. The third purpose is the utilization for synchronous detection of the received data signal.

The second purpose which is related to this invention is explained. A mobile terminal receives pilot signals from a plurality of base stations. A pilot signal received from a base station associated with the mobile terminal is referred to as a desired pilot signal, and the level ratio (SINR) of the desired pilot signal with other received pilot signals is estimated. Based on this SINR value, the mobile terminal determines a data rate at the mobile terminal from the associated base station and sends a request for this data rate to the associated base station. The larger the SINR value, the higher the data rate which the mobile terminal requests from the base station. The base station transmits a downlink signal including the pilot signal to the mobile terminal in accordance with the data rate requested. In this process, if the mobile terminal estimates the SINR lower than the value commensurate with the actual condition, then, the data rate requested from the base station will be lower than it should be and the data transfer rate is reduced. In the case where the mobile terminal estimates the SINR higher than the value commensurate with the actual condition, on the contrary, the condition of the propagation path is worse than estimated, and therefore the reception at the mobile terminal fails with the result that the signal needs to be repeatedly retransmitted. In order to operate the data communication system with high efficiency, the mobile terminal is required to estimate the SINR value with high accuracy. In order for the mobile terminal to estimate the SINR value with high accuracy, the factors causing an interference are desirably reduced as much as possible. This is because each factor of interference would cause an estimation error of the interference power of a mobile terminal, and in the case where the interference factors are great in number, the estimation errors are accumulated.

Pilot signals are categorized into a common pilot signal transmitted to all the cell areas or all the sector areas into which a given cell is spatially divided, and a dedicated pilot signal transmitted only to a specified mobile terminal. The common pilot signal is generally used for the first purpose described above, while the dedicated pilot signal is generally employed for the second and third purposes.

As many dedicated pilot signals as mobile terminals exist. A base station, therefore, transmits a multiplicity of dedicated pilot signals at a time. An explanation is given below about a multiplexing scheme of a dedicated channel including the dedicated pilot signal and the dedicated data signal.

First, the conventional technique for multiplexing the channels in space domain is explained. A base station realizes the space division multiplexing by using different directivity gains between the dedicated channels for transmission to a given mobile terminal 1 and the dedicated channel for transmission to another mobile terminal 2. With the approach of the directions of the mobile terminals as viewed from the base station, however, the dedicated channel transmitted to the mobile terminal 1 is received as an interference by the mobile terminal 2 due to the effect of the directivity gain. An increased interference deteriorates the SINR estimation accuracy and the SINR of the mobile terminal 2. As the transmission rate to each mobile terminal is determined in accordance with SINR, the signal transmission rate from the base station to the mobile terminal 2 is therefore reduced, which in turn reduces the throughput of the transmission to each mobile terminal from the base stations as a whole.

Apart from the space domain, the code division multiplexing scheme can reduce the interference using the orthogonal code such as the Walsh code for the dedicated channels transmitted. According to this scheme, no interference occurs within a cell in the absence of a multipath. Unlike in the space division multiplexing, therefore, the interference is not changed according to the direction of the mobile terminal. In the case where there is a multipath or an interference occurs from other cells, however, all the pilot signals multiplexed act as an interference wave, thereby deteriorating the SINR estimation accuracy and the SINR of the mobile terminal.

Further, the time division multiplexing has been conceived in which dedicated channels are transmitted not at a time but sequentially according to a schedule. In this method, the multipath which may exist has no effect on the interference, and the fact that only one dedicated channel is transmitted in a given time domain is considered to reduce the effect of the interference from other cells. Since the pilot signals are transmitted intermittently, however, a longer time is necessary to estimate SINR than in other methods. In a mobile terminal requiring an action against the fast fading, therefore, the delay has a significant effect. As a result, even in the case where a high-accuracy SINR estimation is possible at the time point of measurement, the longer updating period poses the problem that the estimation result is different from the fast-varing propagation at the time of actual transmission from the base station to the mobile terminal. Consequently, the SINR estimation accuracy at the mobile terminal is deteriorated.

SUMMARY OF THE INVENTION

As described above with reference to the prior art, each multiplexing scheme has both advantages and disadvantages. In order to make the most of the advantages of each multiplexing scheme, it is effective to switch the multiplexing scheme adaptively. Then, the SINR and the transmission rate are prevented from being reduced.

The propagation environment undergoes a constant change, and therefore a fixed multiplexing scheme would unavoidably reduce the SINR and transmission rate of each mobile terminal. This reduction can be avoided by adaptively switching the multiplexing scheme.

The adaptive change of the multiplexing scheme requires a corresponding process at the mobile terminal. Thus, a means for identifying the multiplexing scheme is required.

Accordingly, it is an object of this invention to provide a pilot signal transmission and reception method and a base station and a mobile terminal therefor in which the multiplexing scheme of the data signal and the pilot signal is adaptively assigned.

The use of a signal transmission method in which the multiplexing scheme of the data signal and the pilot signal is adaptively assigned can prevent the SINR reduction at the mobile terminal to which the signal is transmitted, thereby improving the data transmission rate.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing an example of a configuration of the space domain proximity table.

FIG. 6 is a diagram showing an example configuration of the propagation path information recording table.

FIG. 7 is a diagram showing an example configuration of the resource assign table.

FIGS. 14A and 14B are diagrams showing an example configuration of the space domain proximity table.

FIGS. 15A and 15B show an example of a configuration of the propagation path information recording table.

FIGS. 16A and 16B show an example of the configuration of the resource assign table.

FIG. 17 is an operation flowchart showing an example of the operation for assigning the frequency resource at a base station.

DESCRIPTION OF THE EMBODIMENTS

Figure 1:
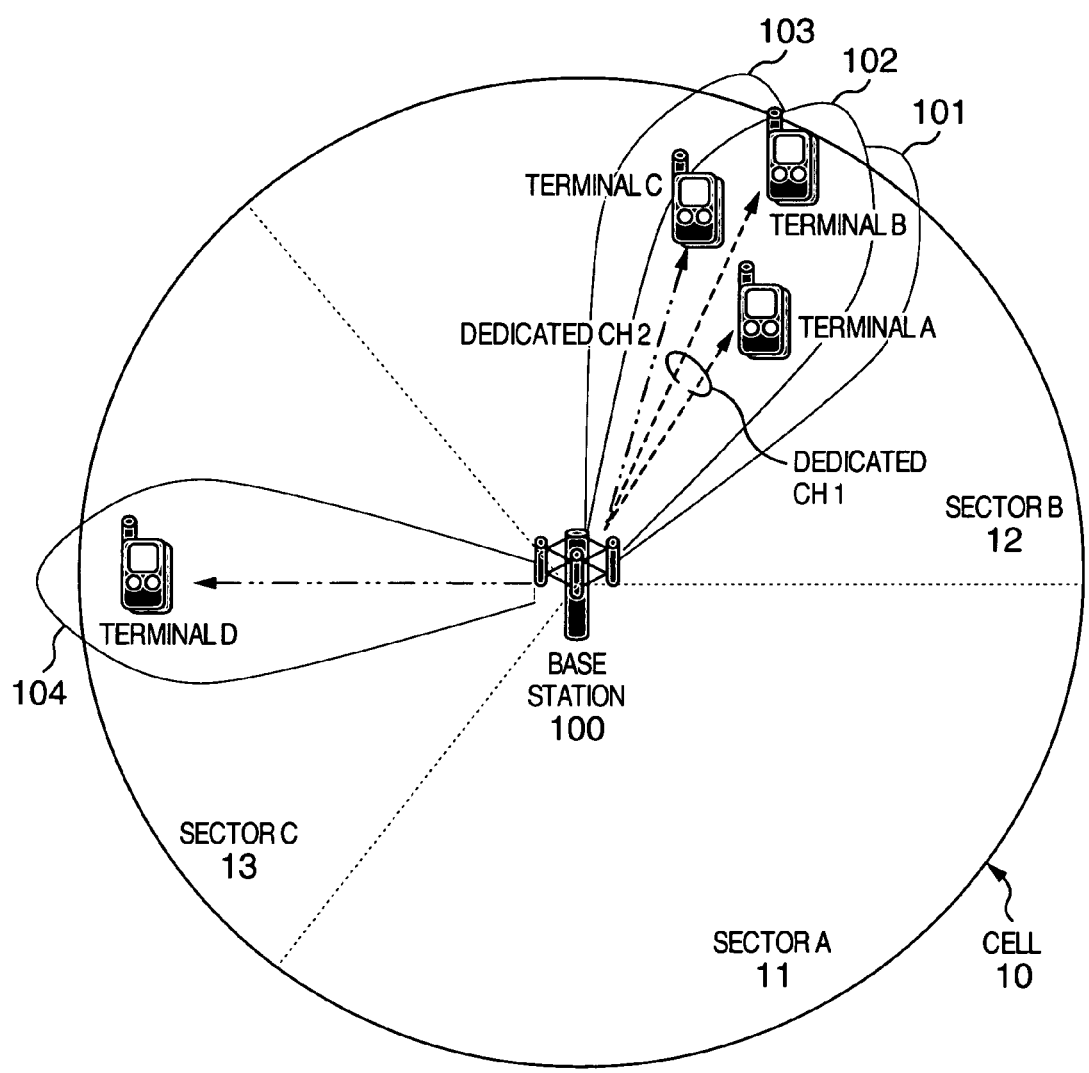
FIG. 1 is a diagram showing a network configuration in an example communication system between a base station and mobile terminals according to this invention.

FIG. 1 shows a network configuration of an example of a communication system between a base station and mobile terminals.

A base station 100 transmits downlink signals to mobile terminals A, B, C and D using different frequency resources for the different mobile terminals. The base station, in establishing the connection with a mobile terminal, first assigns the mobile terminal to a dedicated channel managed by the base station. The dedicated channels in the number required for simultaneous transmission from the base station are prepared. Each dedicated channel is integrated by the Walsh code assigned to the dedicated channel for code division multiplexing. The base station transmits a downlink packet by selecting a given mobile terminal for each slot of each dedicated channel. By way of explanation, consider a system having two dedicated channels. According to this embodiment, an equal number of mobile terminals are assumed to be assigned to each dedicated channel, and the base station assigns a dedicated channel 1 to the mobile terminals A, B and a dedicated channel 2 to the mobile terminals C, D. The base station transmits packets by selecting at least one of the mobile terminals A, B from the dedicated channel 1 and at least one of the mobile terminals C, D from the dedicated channel 2 for each slot. One of the criteria for selecting a mobile terminal in a dedicated channel is the condition of the downlink propagation path. Each mobile terminal measures the condition of the downlink propagation path (SINR, for example) and feeds back the propagation path condition to the base station. The base station coordinates the result of feedback for each mobile terminal as shown in FIG. 6. The propagation path condition is quantized and fed back as an index, and therefore the propagation path condition shown in FIG. 6 is recorded as an integer value. The larger the numerical value, the higher the quality of the propagation path and the higher the transmission rate that can be achieved. In accordance with the table of FIG. 6, the base station selects and transmits packets to a mobile terminal having a satisfactory propagation path condition. Thus, the throughput of the base station is improved as compared with when a mobile terminal is selected at random or in round robin. This invention is not limited to a method in which an equal number of mobile terminals are assigned to dedicated channels as in this embodiment. As an alternative, in the case where the mobile terminal A requires a service higher in priority, for example, the dedicated channel 1 is assigned to the mobile terminal A and the dedicated channel 2 to the other mobile terminals B to D. In this way, dedicated channels may be assigned to the mobile terminals unequally.

The directivity gains 101, 102, 103, 104 are for the beam directed to the mobile terminals A, B, C, D, respectively. According to this embodiment, the directions to the mobile terminals A, B, C as viewed from the base station are proximate to each other, and therefore the directivity gains 101, 102, 103 are superposed one on another. This indicates that the signals transmitted to the mobile terminals A, B, C cannot be separated in space domain. The separability is determined by the base station. One criterion for determining the separability is a threshold of the angle difference between mobile terminals based on the estimated arrival directions of the uplink signals from the mobile terminals. The base station determines that the separation in space domain is impossible in the case where the angle difference is smaller than the threshold (e.g. 5 degrees). Thus, mobile terminal combinations that cannot be separated from each other in space domain are recorded in the same time-code assignment prohibition table shown in FIG. 5 to prevent the assignment of the same time resource and code resource (hereinafter called time-code resource) to the particular mobile terminals (i.e. both time resource and code resource are the same.) The space domain proximity table records the combinations of mobile terminals that are inseparable in the space domain, therefore it cannot be assigned the same time-code resource for transmission. In the case where the same time-code resource is assigned by the base station to the mobile terminals that cannot be separated in space domain, the mobile terminals would interfere with each other. By recording the mobile terminal combinations as described above, therefore, the communication quality is not deteriorated by the interference.

The base station assigns different time or code resources to the mobile terminals A, B, C that cannot be separated from each other in space domain. Since the code resource to be used is fixed for each dedicated channel, the assignment of the code resource is completed with the assignment of a dedicated channel. At this time point, the mobile terminals A, B cannot be separated in space domain or code domain. Therefore, the base station separates the mobile terminals in time domain by allocating different time slots for transmitting signals to the mobile terminals A and B. This assignment is recorded in the frequency resource assign table shown in FIG. 7. PN value in the code domain column in FIG. 7 designates the offset amount of the PN code. In similar fashion, characters ALL in the time domain column designates that transmission is possible at all times, and characters Div1/2, Div2/2 that transmission is possible in the first half and the last half, respectively, in the case where the transmission time is divided into two parts.

The base station selects the destination mobile terminal for each dedicated channel based on the resource assign table shown in FIG. 7 and the propagation path information recording table shown in FIG. 6. The packets are thus transmitted using the time, space and/or code resources shown in the resource assign table.

The embodiment described above presupposes a case in which the cell 10 is not divided into sectors. If the cell 10 is divided into a plurality of sectors 11, 12, 13, however, each sector can be regarded as a cell for the purpose of applying this invention. In the case where the cell is not divided into sectors, on the other hand, the mobile terminal discriminates the downlink signal for each base station, and therefore the base station multiples a different PN code for each cell and transmits a downlink signal. In the case where the cell 10 is divided into sectors, the base station transmits a downlink signal by integrating a different PN code for each sector. Thus, each division sector can be regarded as an independent cell. The present invention is therefore applicable also to a case in which the cell 10 is divided into a plurality of sectors 11, 12, 13 because each sector can be regarded as a cell.

Figure 2:
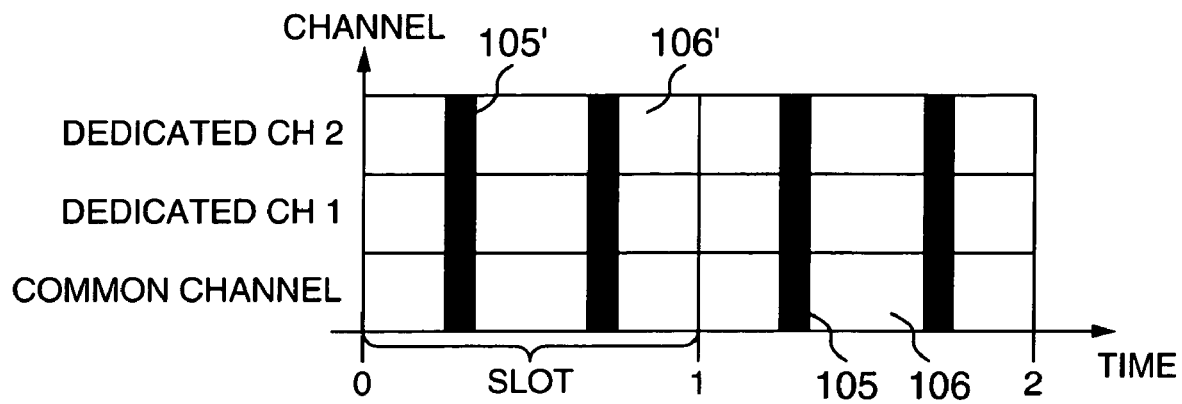
FIG. 2 shows a signal format representing an example configuration of the channel transmitted and received between the base station and the mobile terminals.

FIG. 2 is a diagram showing a format according to a configuration example of the channels transmitted and received between the base station and the mobile terminals.

A common channel and dedicated channels share the property that the pilot signal and the data are regularly transmitted in slots.

The common channel includes data 106 and a pilot signal 105 transmitted to all the mobile terminals in the cell 10 by the base station, the pilot signal and the data being multiplexed by time domain. The pilot signal of the common channel is used by the mobile terminal to search for a cell. In the case where different base stations use different PN codes for transmitting signals, the common pilot signal is reduced in the correlation between the base stations. No problem is posed if different PN codes are replaced by the same PN code generated with a different offset for each base station in view of the fact that the level of correlation is reduced. The mobile terminal searches for a base station having the strongest receiving power of the pilot signal by the correlating operation and determines the particular base station as a base station for communication with the other party. One of the data of the common channel is a downlink control signal shown in FIG. 9. The control signal is used to notify the mobile terminals of the frequency resource used for communication the base station and the mobile terminals for each slot.

The dedicated channel includes a pilot signal 105' and data 106' transmitted toward a specified mobile terminal from the base station, the pilot signal and the data being multiplexed by time division. The pilot signal of the dedicated channel is used by the mobile terminal to estimate the propagation path condition of the dedicated channel. The data of the dedicated channel is the data (e.g. with information contents) transmitted to the particular mobile terminal from the base station.

The common channel and the dedicated channel are transmitted by being multiplexed in time, space and code domains. The time, space and code to be assigned are called a frequency resource. For the data rate to be controlled according to the receiving condition of the pilot signal, it is critical that the SINR of the pilot signal and the SINR of the data signal are equivalent to each other. For this purpose, for example, the base station transmits the pilot signal and the data signal by time multiplexing with the same power. Then, to the extent that the fading fluctuation in the slot is regarded as a flat fading, the SINR of the pilot signal becomes the same as the SINR of the data. By measuring the SINR of the dedicated pilot signal, therefore, the SINR of the dedicated data signal can be effectively estimated. As long as the receiving condition of the data signal can be estimated from the receiving condition of the pilot signal with reasonable accuracy, the pilot signal and the data signal may be transmitted by other methods such as code division multiplexing.

The common channel and the dedicated channel, however, should be multiplexed by code division. The common channel and the dedicated channel are not multiplexed space domain in view of the need of the common channel to transmit the same signal in all directions. The base station is required to notify the information on the mobile terminal communicated with by the dedicated channel in slots and the frequency resource used by the dedicated channel to all the mobile terminals in the cell, and therefore the continuous transmission is indispensable. Therefore, the common channel cannot be suitably multiplexed by time domain with the dedicated channel. It is thus necessary to multiplex the common channel and the dedicated channel in code domain. The base station integrates the same PN code for the common channel and the dedicated channel. The code division multiplexing can be implemented, however, by integrating a different Walsh code for each channel.

The dedicated channel is for communication of the information unique to each mobile terminal. Specifically, one dedicated channel may be either occupied by one mobile terminal or shared by a plurality of mobile terminals. Basically, however, a different frequency resources (time, space or code) are used for different mobile terminals in order to avoid the interference between mobile terminals. Based on this principle, in the case where a dedicated channel is shared by a plurality of mobile terminals, the frequency resource used by the dedicated channel is required to be switched each time the mobile terminal for packet communication is changed. Once the connection of a mobile terminal is established with a given dedicated channel, the dedicated channel assignment is assumed to remain unchanged until the power of the mobile terminal is turned off or a hand-over to another cell occurs or otherwise the communication by the particular dedicated channel is ended. It is also assumed that a unique code resource (sequence number of the Walsh code) is assumed to be fixedly used for each dedicated channel to facilitate the control operation.

Figure 3:
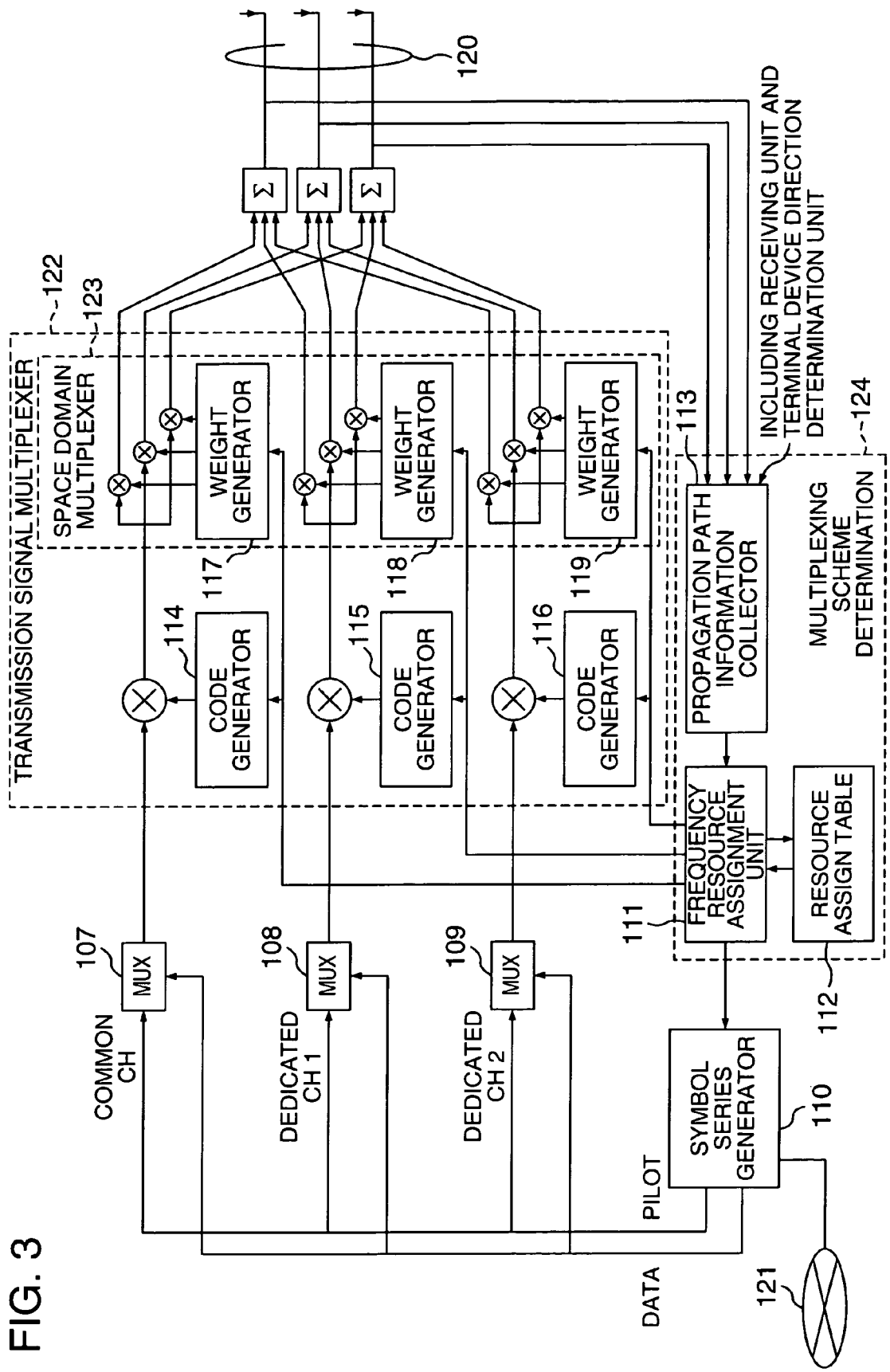
FIG. 3 is a block diagram showing an example configuration of the base station.

FIG. 3 is a block diagram showing an example configuration of the base station. The multiplexing units MUX 107, 108, 109 multiplexes by time domain the pilot signal and the data signal of each of the common channel and the dedicated channels, and generate packets in slots as shown in FIG. 2. The pilot signal and the data signal are both modulated signals, and therefore shown as a series of symbols expressed by complex numbers.

The dedicated pilot signal is a series of symbols known to the mobile terminal and used by the mobile terminal for synchronization and estimation of the propagation path condition for each channel. This series is generated by a symbol series generating unit 110. However, if there is no mobile terminal assigned to a given dedicated channel for packet communication by the frequency resource assignment unit 111. The symbol series generating unit 110 generates no pilot signal for the particular dedicated channel and outputs the symbol series of the complex numbers of all zeros. The pilot signal of the common channel, however, is output all the time.

The data signal is stored as a bit series indicating the transmission data transmitted from the inter-base station network 121 to the symbol series generating unit 110, which generates a symbol series by encoding and modulating a bit series. In the symbol series generating unit 110, a mobile terminal for packet communication conducted by each dedicated channel is designated by the frequency resource assignment unit 111 for each slot. Basically, the symbol series generating unit 110 generates the data signal providing a symbol series of complex numbers encoded and modulated from the bit series to be transmitted to each mobile terminal designated by the frequency resource assignment unit 111. However, if there is no mobile terminal for packet communication designated by the frequency resource assignment unit 111 for a given dedicated channel, the data signal is not generated for the particular channel by the symbol series generating unit 110, but a symbol series of complex numbers of all zeros is generated.

The multiplexing units MUX 107, 108, 109 are processing units for generating a slot-long packet by time division multiplexing the pilot signal and the data signal input from the symbol series generating unit 110. FIG. 2 presupposes the time division multiplexing by the multiplexing units MUX 107, 108, 109. However, the receiving condition of the data signal is estimated using the pilot signal, and the code division multiplexing may be conducted by multiplying different codes assigned to the pilot signal and the data signal by the multiplexing unit MUX 107, 108, and 109.

The symbol series generating unit 110 is configured of a memory for receiving and storing the data from the inter-base station network 121, which data is to be transmitted through the dedicated channel and the common channel, and a firmware for generating a data symbol series by designating a mobile terminal for packet communication through each dedicated channel from the frequency resource assignment unit 111.

The data signal of the dedicated channel is scrambled with scrambling sequence (Walsh code) independently in the symbol series generating unit 110 for each mobile terminal before modulation to ensure the confidentiality. The scramble code is generated by the symbol series generating unit 110 using shift registers. Nevertheless, any method may be used in which the initial condition and the masking method depend on the mobile terminal number. Further, the symbol series generating unit 110 generates a pilot signal known to the mobile terminal. For example, the entire section of the pilot signal is mapped to the complex numbers (1, 0). The pilot signal is formed of a fixed pattern and therefore stored in a memory. The symbol series generating unit 110 generates the pilot signal and the data signal of the complex number 0 for the dedicated channel for which no mobile terminal for packet communication is not designated by the frequency resource assignment unit 111. Incidentally, the state in which a mobile terminal for conducting the communication in all the dedicated channels is designated by the frequency resource assignment unit 111 corresponds to the state in which no time division multiplexing is carried out. In other words, as long as the same time resource is assigned to all the dedicated channels by the frequency resource assignment unit 111, the state of no time division multiplexing is realized.

The symbol series generating unit 110 generates a pilot signal similar to the dedicated channel and a data signal providing a control signal to be transmitted by the common channel. The control signal includes the information on the mobile terminal using each dedicated channel shown in FIG. 9 and the frequency resource used by the particular mobile terminal. As the result of the symbol series generating unit 110 generating this information as a control signal, the traffic of the control signal increases in the common channel of the radio communication path. The mobile terminal, however, can perform the operation for confirming the dedicated channel and the resource without modulating or decoding the dedicated channels, and therefore the process of modulation and decoding is reduced.

A multiplexing method determining unit 124 collects the propagation path information of each downlink channel and assigns and manages the frequency resource. The frequency resource assignment unit 111 designates the frequency resource (time, space or code) used in each dedicated channel for each slot and a mobile-terminal for communication. The frequency resource assignment unit 111 also designates the frequency resource used by the common channel. The result of designation is notified to the symbol series generating unit 110, the code generating units 114, 115, 116 of the transmission signal multiplexing unit 122 and the weight generating units 117, 118, 119 of the space division multiplexing unit 123, and recorded in the resource assign table 112 shown in FIG. 7. The information used for designating the frequency resource are acquired from the propagation path information collecting unit 113 and the resource assign table 112. This is described in more detail later with reference to FIGS. 4 to 7.

The resource assign table 112 is a memory for recording the frequency resource (time, space, code or any combination thereof) used in each dedicated channel designated by the frequency resource assignment unit 111 and a combination of the mobile terminals for communication in the particular dedicated channel. This is explained in more detail later with reference to FIG. 4.

The propagation path information collecting unit 113 is an processing unit configured of the hardware and the firmware supplied with the signal received directly through the array antenna for each element and has the following two functions. One of the functions is to collect the propagation path information of a downlink dedicated channel which is transmitted by the mobile terminal. The other function is for the base station to collect its own space resource of the downlink channel without resorting to the propagation path information from the mobile terminal.

Figure 10:
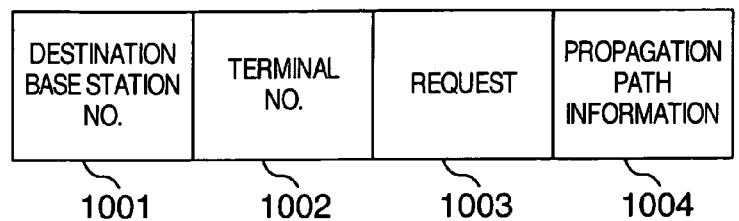
FIG. 10 is a diagram showing a signal format as an example structure of the uplink control signal.

The former function is used as a means for confirming the condition of the downlink propagation path leading to the mobile terminal. Specifically, the mobile terminal includes a propagation path condition estimation unit, and an indicator for monitoring the propagation path condition is arranged in the uplink control channel. A specific example of the indicator is shown in FIG. 6. A specific example of the uplink control channel is shown in FIG. 10. The propagation path condition obtained for each mobile terminal is sent to the frequency resource assignment unit 111.

The latter function is used by the base station as a means for estimating the occurrence of a space resource conflict between the mobile terminals. Specifically, the propagation path information collecting unit 113 generates the array response vectors for retrieving the dedicated pilot signal arriving from each mobile terminal using the receiving signal input from the antenna element of the array antenna 120, and calculates the spatial correlation between the array response vectors. In the case where the spatial correlation value is not less than a threshold value (0.90, for example), the interference is great, and therefore the base station determines that the downlink packets should not be transmitted to the particular mobile terminal combination with the same time-code resource. This determination is made in the frequency resource assignment unit 111, and the propagation path information collecting unit 113 outputs the information of specific mobile terminal combination and the spatial correlation value. This will be described in more detail later with reference to FIG. 4. As an alternative, the spatial correlation may be replaced with the direction of arrival for each mobile terminal. The direction in which the uplink signal arrives from a mobile terminal can be estimated by the MUSIC or ESPRIT method, and once the difference in the arrival direction between the mobile terminals becomes less than the threshold value (5 degrees, for example), the base station determines that packets should not be transmitted at the same time with the same time-code resource to the particular mobile terminal combination. This determination is made in the frequency resource assignment unit 111, and therefore the propagation path information collecting unit 113 outputs the information on the combination of the mobile terminals and the direction of arrival to the frequency resource assignment unit 111.

The code generating units 114, 115, 116 are the firmware for generating the codes based on the code resource assigned to each dedicated channel and the common channel in the frequency resource assignment unit 111. The codes include the PN code, Walsh code or the like code with high in auto correlation. The code resource designated is represented using the sequence number of the Walsh code or the offset amount of the PN code. The codes thus generated are used for scrambling in the symbol series generated by the multiplexing units MUX 107, 108, 109. The codes are integrated by hardware. Incidentally, the state in which the same code resource is used for all the dedicated channels corresponds to the state in which no code division multiplexing is executed. In other words, no code division multiplexing is realized in the case where the frequency resource assignment unit 111 assigns the same code resource to all the dedicated channels.

The space division multiplexing unit 123 executes the multiplexing in space domain. The weight generating units 117, 118, 119 are the firmware for generating the transmission array weight based on the space resource assigned to each dedicated channel in the frequency resource assignment unit 111. The frequency resource assignment unit 111 designates the omni-directional-radiation array weight for the weight generating unit 111 of the common channel. The space resource designated by the frequency resource assignment unit 111 can be represented with the direction in which packets are transmitted. Therefore, the weight generating units 117, 118, 119 basically generate the array weight for directing the directivity beam (beam forming) in the direction of transmission. Nevertheless, the array weight for steering null to the direction of packet transmission of other dedicated channels may be generated. The array weight thus obtained is multiplied with transmission signals by the hardware for each transmission antenna element, the signal of each channel is added for each element, and the downlink packets are transmitted from the array antenna 120. The array weight is expressed as a complex number and have amplitude element and phase element. The weight integration is intended to change the gain and phase of the input signal. The state in which the same space resource is used for all the dedicated channels corresponds to the state of no space division multiplexing. In other words, the state of no space division multiplexing is realized in the case where the frequency resource assignment unit 111 assigns the same space resource to all the dedicated channels. The direction as viewed from the base station is different for each mobile terminal. Thus, the base station can unify the space resources of the mobile terminals by integrating the directivity gain for omni-directional radiation to all the mobile terminals.

The array antenna 120 is a transmitter/receiver used for both the transmission of the downlink signal and the receiving of the uplink signal. Alternatively, a transmission-only antenna and a receiving-only antenna may be used. At the time of transmitting downlink packets, the frequency is changed from the baseband to the carrier band. At the time of receiving the uplink packets, on the other hand, the frequency is changed from the carrier band to the baseband.

Figure 4:
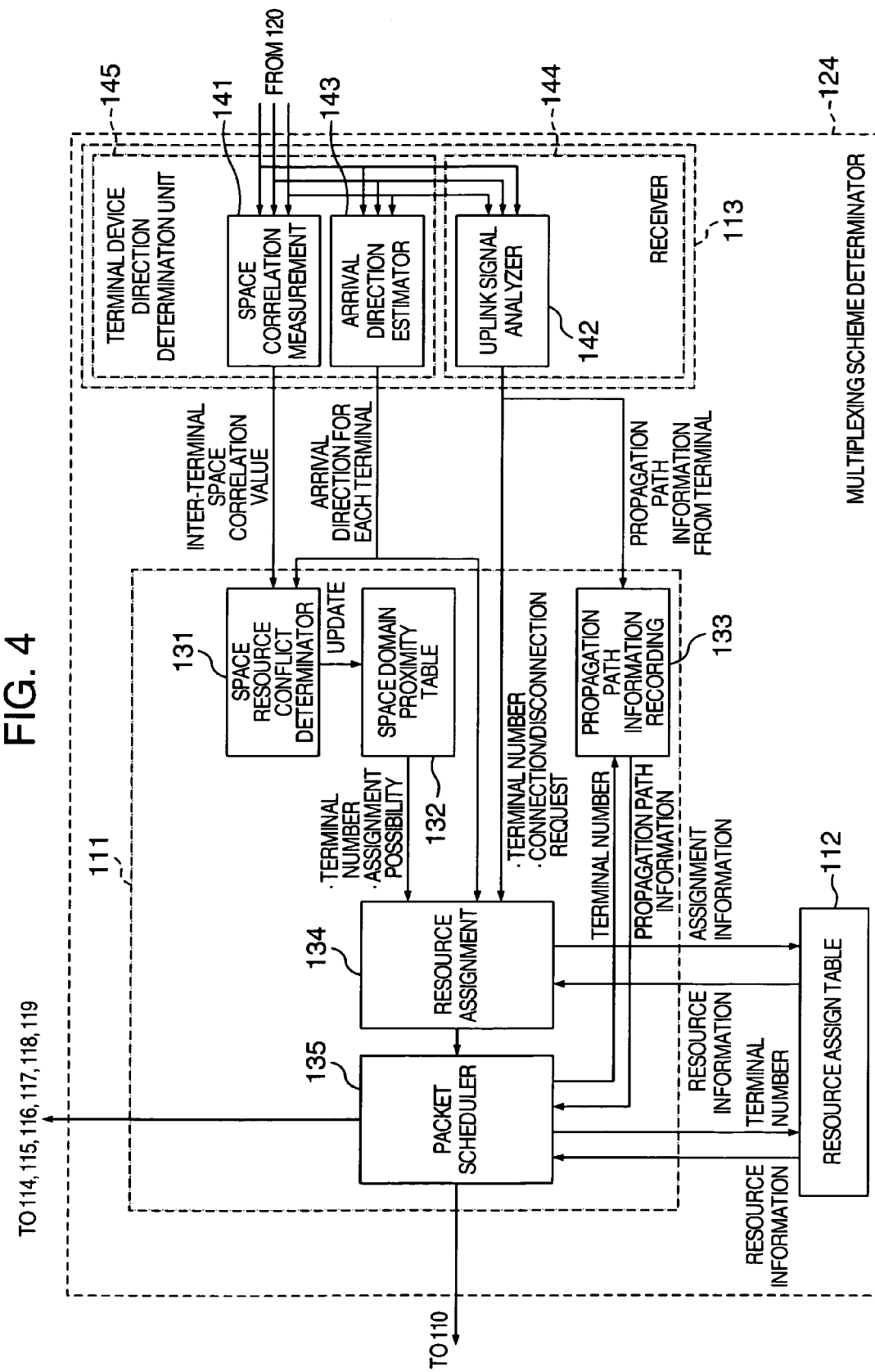
FIG. 4 is a block diagram showing an example configuration of a multiplexing scheme determining unit.

FIG. 4 is a block diagram showing an example configuration of the multiplexing scheme determining unit 124. The receiving unit 144 is assumed as a component part of the multiplexing scheme determining unit. The frequency resource assignment unit 111 includes a space resource conflict determining unit 131 for designating a mobile terminal combination for which the use of the same time-code resource is prohibited to avoid the interference due to the conflict between the space resources of a plurality of the mobile terminals, a same time-code assignment prohibition table 132 for recording a list of the mobile terminals between which the conflict of the space resources has occurred (i.e. for which the same time-code resource cannot be used due to the interference), a propagation path information recording unit 133 for recording the downlink propagation path information for each mobile terminal by analyzing the uplink control signal from the mobile terminal, a resource assignment unit 134 for controlling the assignment and the release of the frequency resource and the dedicated channel for each mobile terminal, and a packet scheduler 135 for determining a mobile terminal for packet communication for each dedicated channel. The propagation path information collecting unit 113 is configured of a receiving unit 144 including an uplink signal analysis unit 142 for retrieving, from the uplink signal, the information transmitted by each mobile terminal, and a mobile terminal direction determining unit 145 including a spatial correlation measuring unit 141 for estimating the spatial correlation between two mobile terminals from the uplink signal and an arrival direction estimation unit 143 for estimating the direction of arrival of the uplink signal for each mobile terminal. The functions of the component elements required for determining a multiplexing scheme are explained above. The system is realized, however, by the hardware and the firmware including a space resource conflict determining unit 131, a resource assignment unit 134, a packet scheduler 135, a spatial correlation estimation unit 141, an uplink signal analysis unit 142, an arrival direction estimation unit 143, a space domain proximity table 132 providing a storage, and a-propagation path information recording unit 133.

The space resource conflict determining unit 131 is the firmware for listing uplink mobile terminal combinations difficult to separate in space domain (the use of the same time-code resource increases the interference). The space resource conflict determining unit 131 records this list in the same time-code assignment prohibition table 132. The list is created by determining the input spatial correlation value between the mobile terminals or the threshold value for the direction of arrival for each mobile terminal. In the case where the spatial correlation value is input to the space resource conflict determining unit 131, the space resource conflict determining unit 131 records the mobile terminal combinations with the correlation value exceeding 0.90, for example, in the same time-code assignment prohibition table 132. Similarly, in the case where the arrival direction is input, the space resource conflict determining unit 131 records a mobile terminal combination in the table if the arrival direction difference between the two mobile terminals is, for example, not more than 5 degrees. The input of the spatial correlation value and the input of the arrival direction of the mobile terminal are identical to each other in the sense that both are indexes to determine the extent of conflict between the space resources. By use of this means, the base station can determine the conflict between the space resources which cannot be easily determined by the mobile terminal. The reason why this determination is difficult for the mobile terminal is that the mobile terminal only estimates the SINR for the desired dedicated channel and cannot specify a particular dedicated channel causing an interference from the estimated SINR.

The same time-code assignment prohibition table 132 is a memory for recording the list created by the space resource conflict determining unit 131. As shown in FIG. 5, the space resource conflict determining unit 131 records each mobile terminal ID 132-1 and a corresponding mobile terminal ID 132-2 which are difficult to separate from each other in space domain and prohibited from assignment of the same time-code resource. The example shown in FIG. 5 indicates that no problem exists for the mobile terminal D but that the mobile terminals A, B, C are difficult to separate in space domain and prohibited from the use of the same time-code resource. The table of FIG. 5 reflects the state shown in FIG. 1. In FIG. 1, the directions as viewed from the base station are proximate to each other for the mobile terminals A, B, C, while the mobile terminal D is distant from the mobile terminals A, B, C. Under this condition, the base station, through the arrival direction estimation unit 143, estimates the direction in which the signal arrives from the mobile terminal and inputs the arrival direction and the mobile terminal IDs (A, B, C, D) to the space resource conflict determining unit 131. The space resource conflict determining unit 131 determines whether the arrival direction difference for each combination of two mobile terminals is larger or smaller than a threshold, and the combinations of the mobile terminal IDs with a smaller arrival direction difference than the threshold are recorded in the same time-code assignment prohibition table shown in FIG. 5. This table is accessed by the resource assignment unit 134 so that the same time-code resource is not assigned to the mobile terminal combinations shown in the table of FIG. 5. As a result, the interference which otherwise might occur between the mobile terminals prohibited from the same time-code assignment is eliminated by code division multiplexing or time division multiplexing for an improved transmission rate to the particular mobile terminals. Also, the direction of signal arrival from each mobile terminal estimated by the arrival direction estimation unit 143 is input through the resource assignment unit 134 to the resource assignment table 112 shown in FIG. 7.

The propagation path information recording unit 133 is a memory for recording the propagation path information of each mobile terminal extracted by the uplink signal analysis unit 142. Based on the analysis of the uplink signal analysis unit 142, the mobile terminal ID 136-1 and the downlink propagation path condition 136-2 (such as SINR or an index indicating the quality) of the particular terminal are recorded in correspondence with each other in the propagation path recording table 136 shown in FIG. 6 of the propagation path information recording unit 133. The larger the numerical value of the index, the higher the quality of the propagation path, and hence the higher the transmission rate that can be realized. In view of the fact that the base station has a table whereby an index can be converted into a transmission rate, the index has a physical significance and constitutes a parameter for selecting the mobile terminal in the dedicated channel through the packet scheduler 135. In the case of FIG. 6, the index values 3, 4, 7 are recorded, which correspond to 307.2 kbit/s, 614.4 kbit/s and 1228.8 kbit/s, respectively.

The resource assignment unit 134 is a firmware for assigning the dedicated channel and the frequency resource to each mobile terminal. This unit 134 checks the current assignment condition of the dedicated channel by accessing the resource assign table 112, and assigns each dedicated channel in such a manner as to have about an equal number of mobile terminals associated with each dedicated channel. The operation of assignment of the dedicated channel is performed at the time point when the resource assignment unit 134 refers to the control signal obtained in the uplink signal analysis unit 142 and acquires a connection request for the base station. Also, the resource assignment unit 134 deletes the information for a particular mobile terminal from the resource assign table 112 when the disconnection request for that mobile terminal is acquired by the uplink signal analysis unit 142. The uplink control signal will be explained later with reference to FIG. 10.

Now, the frequency resource information is explained. The code resource information is a parameter (such as the offset amount of the PN code or the sequence number of the Walsh code) of the code used for each mobile terminal. According to this embodiment, the code resource is fixed for each base station and each dedicated channel. The space resource information is the direction of the directivity beam for transmitting the downlink signal for each mobile terminal. The direction is quantized by the resolution of the transmission direction of the base station. The time resource information indicates whether the transmission is possible by all the slots or the slots usable for transmission are limited.

The frequency resource is assigned by the resource assignment unit 134 by the method described below. (1) The code resource unique to the base station and the dedicated channel is assigned. (2) The space resource designates the direction of the directivity beam for transmitting the downlink signal based on the result of the arrival direction estimation for each mobile terminal. Further, the direction is quantized in accordance with the resolution in the transmission direction of the base station. (3) Regarding the time resource, all the slots are basically available for transmission. In the case where the separation in space domain is difficult and the same code resource is used for the mobile terminals, the time (slots)

usable for transmission to each mobile terminal is limited. As a result, the simultaneous use of the same time-code resource by the mobile terminal difficult to separate in space domain is avoided. The resource assignment unit 134, by referring to the same time-code assignment prohibition table, can be informed of the mobile terminal combinations difficult to separate in space domain.

The assignment of the frequency resource and the dedicated channel are explained with reference to the table configuration diagram showing an example configuration of the resource assign table 112 of FIG. 7. The dedicated channel for each mobile terminal is assigned by the resource assignment unit 134 in such a manner that the mobile terminals are equally associated with the dedicated channels. The resource assignment table 112 has stored therein, for each mobile terminal ID 112-1, a corresponding dedicated channel ID 112-2 and the frequency resources 112-3 such as the code 112-4, the space 112-5 and the time 112-6. According to this embodiment, the code resource uses the PN offset for identification of the base station and the Walsh code for identification of the dedicated channel. Therefore, the same PN offset is assigned to all the mobile terminals, and the same Walsh code for each dedicated channel. The arrival direction of each mobile terminal estimated by the arrival direction estimation unit 143 is quantized by degree and recorded as a space resource. With regard to the time resource, the resource assignment unit 134 accesses the same time-code assignment prohibition table (FIG. 5) and the code resource assignment result (FIG. 7), and determines whether each mobile terminal meets the following two criteria.

(1) As to whether there is any mobile terminal to which assignment is prohibited as the result of referring to the same time-code assignment prohibition table.

(2) As to whether there is any mobile terminal having the same code resource in the case where a mobile terminal to which assignment is prohibited exists.

Each mobile terminal is evaluated in the example of FIG. 7. The mobile terminals A, B, C meets the condition (1) and the mobile terminals A, B by (2). Thus, the resource assignment unit 134 records an indicator to the effect that all the slots can be used for data transmission for the mobile terminals C, D not meeting condition (2) (designated as ALL). The transmission time of the mobile terminals A, B meeting the condition (2) are required to be different from each other. In shifting the transmission time, the indicator is recorded (expressed as Div N-M) to the effect that transmission is allowed at the Nth slot of the period of M slots for each mobile terminal, where M is the number of mobile terminals meeting the conditions (2). The order (N) of the mobile terminals in the period M is determined by the resource assignment unit 134 in the ascending order of the mobile terminal number, as an example.

The packet scheduler 135 is a firmware for designating for each slot the mobile terminal for conducting the packet communication in each dedicated channel. The packet scheduler 135 determines a mobile terminal in accordance with the procedure described below for each dedicated channel. (1) The mobile terminals are ranked in the descending order of the downlink propagation path condition (transmission rate). (2) Referring to the time resource of the resource assign table, the mobile terminal ranked at the highest order in (1) is selected out of the mobile terminals capable of transmission with the particular slot. The packet scheduler 135 sends the information on the mobile terminal selected in (2) to the symbol series generating unit 110, the code generating units 114, 115, 116 and the weight generating units 117, 118, 119.

The packet scheduler 135 sends the mobile terminal number for each dedicated channel to the symbol series generating unit 110. In similar fashion, the packet scheduler 135 sends the code resource corresponding to the mobile terminal communicating in the dedicated channel and the code resource for the common channel to the code generating units 114, 115, 116. Also, the packet scheduler 135 sends the space resource corresponding to the mobile terminal communicating in the dedicated channel and the space resource (the array weight for omni-directional radiation) of the common channel to the weight generating units 117, 118, 119. The ranking in (1) above, though emphasizing the frequency utilization efficiency, poses the problem of fairness between the mobile terminals, and therefore what is called the proportional fairness may be employed for determining the ranking by the evaluation function of the total transmission rate of the base station divided by the average transmission rate of each mobile terminal. The proportional fairness maintains the fairness among the mobile terminals. In the case where there is a dedicated channel by which no transmission to the mobile terminal is possible as the result of selection in (2) above, the packet scheduler 135 designates no mobile terminal for the symbol series generating unit 110 to conduct packet communication in the particular dedicated channel. As a result, the particular dedicated channel with transmit all complex numbers zero and interferes no other channel. The processes (1) and (2) above may be inverted in order.

The spatial correlation measuring unit 141 is a hardware or a firmware for calculating the response vector correlation, i.e. the spatial correlation configured of the channel response of each array antenna element. The response vector is the vectorized result of estimating the channel response for each array antenna element by calculating the correlation between the pilot signal transmitted from each mobile terminal and the pilot signal known at the radio communication unit. The particular response vector is calculated for each mobile terminal. The spatial correlation value is defined for each pair of the mobile terminals as a correlation value of the response vector.

The spatial correlation $\rho$ is expressed by the equation below. Assuming that M is the number of array antenna elements, the array response vectors $X_1$, $X_2$ of the signals transmitted from the first and second mobile terminals, respectively, are given as $$X_1 = [e^{j\theta_{11}} e^{j\theta_{12}} \cdots e^{j\theta_{1M}}]^T$$
$$X_2 = [e^{j\theta_{21}} e^{j\theta_{22}} \cdots e^{j\theta_{2M}}]^T$$

where T denotes the transposition. Then, the spatial correlation $\rho$ is given as $$\rho = \frac{X_1^* X_2^T}{\|X_1\| \cdot \|X_2\|}$$

The combination of the spatial correlation value and the mobile terminal thus obtained is notified to the space resource conflict determining unit 131.

The arrival direction estimation unit 143 is an arithmetic unit for estimating the arrival direction for each mobile terminal using the MUSIC method or the like. According to the MUSIC method, the correlation matrix of the receiving signal for each array antenna element is determined, and by analyzing the eigen value thereof, the arrival direction of the uplink signal is estimated for each mobile terminal. The spatial correlation measuring unit 141 sends the paired information including the arrival direction and the mobile terminal thus obtained to the space resource conflict determining unit 131 and the resource assignment unit 134.

The uplink signal analysis unit 142 is the hardware and the firmware for extracting the propagation path information and the control signal for each mobile terminal from the uplink packet downlink-converted to the baseband, and configured of the hardware for demodulation or decoding and the firmware for retrieving a message such as a connection request or the propagation path information transmitted by a given mobile terminal, from the signal after decoding. The uplink signal analysis unit 142 stores the propagation path information from the mobile terminals in the propagation path information recording unit 133. In the case where the control signal contains a connection request or a disconnection request to the base station, the uplink signal analysis unit 142 notifies the ID number of the particular mobile terminal and the information on the connection or the disconnection, as the case may be, to the resource assignment unit 134. The uplink control signal is explained later with reference to FIG. 10.

Figure 8:
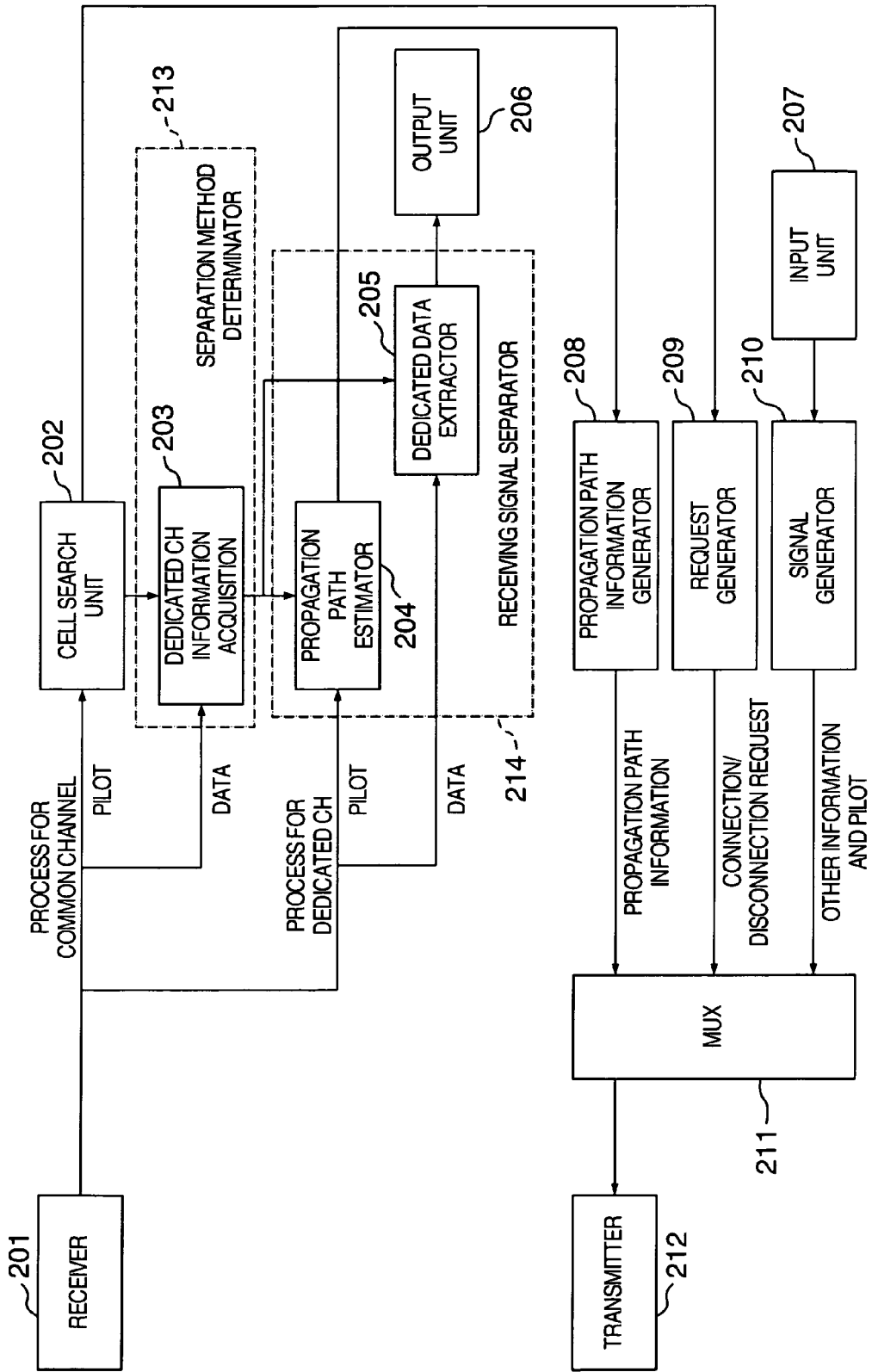
FIG. 8 is a block diagram showing a configuration example of a mobile terminal.

FIG. 8 is a block diagram showing an example configuration of the mobile terminal. The mobile terminal is configured of a receiving unit 201 for receiving a downlink packet and converting it from the carrier band to the baseband, a cell search unit 202 to search for a base station that it can receive the signal with the highest reception power using the pilot signal of the common channel, a dedicated channel information acquisition unit 203 for collecting the information (frequency resource) for receiving the dedicated channel of a base station from the information contained in the common channel of the particular base station obtained by the cell search, a propagation path condition estimation unit 204 for estimating the propagation path condition of the dedicated channel pilot signal using the acquired frequency resource information, a dedicated data extraction unit 205 for retrieving the data signal of the dedicated channel using the same frequency resource information, an output unit 206 for outputting the extracted data to an image output unit, a voice output unit or a data output unit, an input unit 207 for converting the input from an image input unit, a voice input unit or a data input unit into a bit stream, a propagation path information generating unit 208 for converting the propagation path information of the dedicated channel acquired in the propagation path condition estimation unit 204 into a bit stream in the form recognizable by the base station and generating a symbol series of complex numbers, a request generating unit 209 for converting a connection or disconnection request to the base station into a bit stream in the form recognizable by the base station and generating a symbol series of complex numbers, a signal generating unit 210 for generating a symbol series of complex numbers from the pilot signal and the bit stream generated in the input unit 207, a multiplexing unit MUX 211 for generating an uplink packet by multiplexing the propagation path information, the connection/ disconnection request, the data and the pilot signal, and a transmission unit 212 for uplink-converting the multiplexed signal from the baseband to the carrier band and transmitting an uplink packet.

In order to make it possible to discriminate the pilot signal of a specific dedicated channel from all the pilot signals received by the mobile terminal, it is important that the common channel and each dedicated channel be multiplexed by code division. This is because it is difficult to retrieve a pilot signal of one dedicated channel from the superposed signals not multiplexed by code division. The mobile terminal can retrieve the pilot signal of a specific dedicated channel by time division corresponding to the number of the common and dedicated channels. Even so, the discrimination from the pilot signal transmitted from other cells is difficult. According to this embodiment, therefore, an explanation is given on the assumption that at least the code resource (the offset of the PN code or the sequence number of the Walsh code) is required as a frequency resource handled at the mobile terminal.

The receiving unit 201 is configured of an antenna and a downlink converter (a reference oscillator, an amplifier and a synthesizer) and outputs a baseband signal. In the process, the output signal is comprised of the common channels and the dedicated channels, though different in power, of all the base stations in superposed state.

The cell search unit 202 is a hardware to search for a base station having the highest reception power of the common channel using the code resource of the mobile terminal. Specifically, the cell search unit 202 integrates the code with the pilot signal, calculates the correlation with the received pilot signal of the common channel, and generates a power delay profile for the code resource of each base station. The output is the number of the code resource with the highest reception power. This embodiment assumes that each base station is supplied with a different PN offset (code resource). Therefore, the cell search unit 202 outputs the PN offset of the highest reception power by determining a delay profile. The code resource of the mobile terminal is, in real terms, all the PN offsets that can be output from the base station.

The separation type determining unit 213 acquires the information on the dedicated channel transmitted in the common channel, determines the multiplexing scheme applied to the signal the particular mobile terminal and determines the method of separating the signal addressed to the particular mobile terminal. The dedicated channel information acquisition unit 203 is a hardware and the firmware for extracting the code resource used by the dedicated channel of the base station and the ID number of the mobile terminal which uses each dedicated channel, from the information contained in the common channel of the base station corresponding to the code resource obtained in the cell search unit. The dedicated channel information acquisition unit 203 includes a hardware for demodulation or decoding and the firmware for retrieving, from the decoded signal, the information on the code resource used for the dedicated channel of the particular base station. The information contained in the common channel is explained later with reference to FIG. 9. The dedicated channel information acquisition unit 203 first generates a delay profile of the common channel by the correlation calculation of the pilot signal using the code corresponding to the code resource obtained by the cell search, and thus detects the head timing of the common channel from the relative positions of the packet head and the pilot signal. Next, the dedicated channel information acquisition unit 203 extracts the received signals sequentially from the head timing through the hardware, and arranges the data to the packet end point except for the pilot signal. The data thus arranged are demodulated and, if encoded at the time of transmission, decoded thereby to obtain a transmission bit stream. The dedicated channel information acquisition unit 203 acquires the code resource of the dedicated channel used by the base station from the transmission bit stream through the firmware, and notifies the code resource of the dedicated channel thus obtained and the mobile terminal ID number using the dedicated channel to the propagation path condition estimation unit 204 and the dedicated data extraction unit 205. According to this embodiment, the code resource for identifying the dedicated channel is the sequence number of the Walsh code. The code resource information obtained, therefore, is the sequence number of the Walsh code.

The received signal separation unit 214 separates the data signal and the pilot signal for the particular mobile terminal from the dedicated channel and processes the signals thus separated. The propagation path condition estimation unit 204 is a hardware for estimating the propagation path condition of each dedicated channel using the pilot signal based on the code resource (sequence number of the Walsh signal) obtained in the dedicated channel information acquisition unit 203. The propagation path condition estimation unit 204 specifically multiplies the code (generated with the PN code offset unique to the base station and the sequence number of the Walsh code unique to the dedicated channel) with the pilot signal, estimates the reception power of the pilot signal of the dedicated channel by integrating the received pilot signal of the dedicated channel, determines the noise power plus the interference by subtracting the pilot signal reception power from the total reception power, and thus estimates the SINR by dividing the former by the latter. In the case where the pilot signal of the frequency resource used by the particular mobile terminal is not transmitted, i.e. in the case where there is no number coincident with the mobile terminal number of the local station acquired by the dedicated channel information acquisition unit 203, the propagation path condition estimation unit 204 notifies the propagation path information generating unit 208 that the estimation of the propagation path condition can not be estimated without estimating SINR.

The dedicated data extraction unit 205 is a hardware and firmware for extracting the bit stream of the dedicated channel in a manner similar to that of the dedicated channel information acquisition unit 230 based on the code resource (sequence number of the Walsh code) obtained in the dedicated channel information acquisition unit 203 and the number of the mobile terminal using the dedicated channel. The dedicated data extraction unit 205 extracts no bit stream in the case where the number of the receiving mobile terminal fails to coincide with the mobile terminal number acquired in the dedicated channel information acquisition unit 203.

The output unit 206 processes through the decoder the bit stream extracted in the dedicated data extraction unit 205, and outputs them as an image, a voice or data.

The input unit 207 is supplied with the image, voice or data transmitted through the uplink, and converts the input data into a bit stream through the encoder. These data are sent out as a data signal by the uplink dedicated channel.

The propagation path information generating unit 208 converts the SINR for each dedicated channel acquired in the propagation path condition estimation unit 204 into a form that can be interpreted by the base station, and outputs it as a symbol series. According to this embodiment, SINR is expressed by an integer indicator. Specifically, SINR of −10 dB or more is quantized as 1 and SINR of −7 dB or more as 2. The information having bits in the number corresponding to the number of quantization stages is generated, and therefore the propagation path information generating unit 208 generates a symbol series by modulating the information (by QPSK scheme, for example). The information thus generated constitutes a part of the uplink control signal shown in FIG. 10.

The request generating unit 209 is a hardware or firmware for generating a connection request or a disconnection request in the case where the mobile terminal establishes connection (at the time of switching on the mobile terminal power or hand-off) or is disconnected (at the time of switching power off or hand-off). The mobile terminal requires the information of at least 2 bits for transmitting the information to the base station on the absence of a request, in addition to the connection request and the disconnection request. For example, the connection request is assigned 10, the disconnection request is assigned 01 and the absence of request is assigned 00. The request generating unit 209 modulates the bit series and generates and outputs the symbol series. Two examples of the request generating unit will be explained. First, when power is turned on, a base station to be connected is determined by the cell search and a connection request is sent. After that, the base station assigns a dedicated channel. Secondly, at the hand-off, the mobile station sends a disconnection request to the base station that has thus far been connected, while also sending a connection request to a new base station obtained by the cell search. The information thus generated makes uplink a part of the uplink control signal shown in FIG. 10.

The signal generating unit 210 is a hardware or firmware for generating a symbol series by modulating the pilot signal and the bit stream of the data signal generated in the input unit 207.

The multiplexing unit MUX 211 is a hardware or firmware for multiplexing the symbol series obtained in the propagation path information generating unit 208, the request generating unit 209 and the signal generating unit 210.

The transmission unit 212 is configured of an antenna and an uplink converter (reference oscillator, amplifier, synthesizer), and by converting the output signal (baseband signal) of the multiplexing unit MUX 211 into a carrier band, transmits it to the base station.

Figure 9:
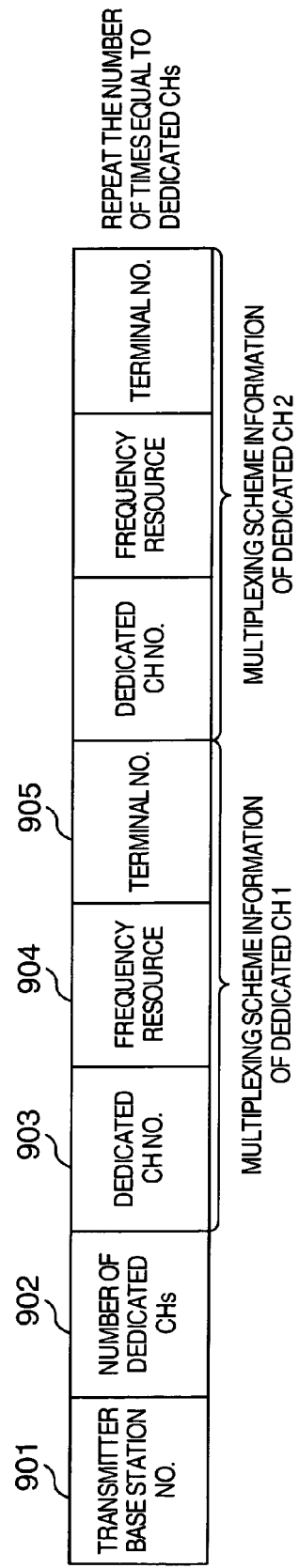
FIG. 9 is a diagram showing a signal format as an example structure of the downlink control signal.

FIGS. 9 and 10 are signal format diagrams showing an example configuration of the downlink control signal. FIG. 9 shows a structure of the downlink control signal transmitted from the base station to the mobile terminal. With the downlink control signal transmitted as the data signal of the common channel, the information on the mobile terminal using each dedicated channel used by the base station and the frequency resource are broadcast to all the mobile terminals in the cell or the sector. The mobile terminal using the dedicated channel is changed for each time slot, and therefore the control signal is transmitted for each time slot. The control signal is transmitted by the common channel. The first field has stored therein the ID number of the base station from which the control signal is transmitted (901). This is a unique ID number in the system. The number-of-dedicated-channels field 902 has stored therein the number of the dedicated channel information transmitted by the control signal. This is normally the number of the dedicated channels held by the base station. Then, the first dedicated channel information and the second and subsequent dedicated channel information are stored. The dedicated channel ID number field 903 has stored therein the ID number of the dedicated channel. The ID number of the dedicated channel, unless otherwise specified, is counted uplink sequentially from 1. The frequency resource field 904 has stored therein the frequency resource information used for the particular dedicated channel. According to this embodiment, the frequency resource information is a sequence number of the Walsh code unique in the cell. As an alternative, however, a transmission direction may be stored as the space resource, a transmission timing limit indicator (ALL or Div N_M in FIG. 7) as the time resource, and the PN code offset of the base station or the sequence number of the Walsh code as the code resource. The mobile terminal number field 905 has stored therein the ID number of the mobile terminal used for packet communication in the dedicated channel. In the case where the same dedicated channel is assigned to a plurality of mobile terminals, the base station describes a plurality of the mobile terminal ID numbers in this field. The mobile terminal ignores the dedicated channel having the ID number not coincident with the ID number of itself.

FIG. 10 shows the structure of the uplink control signal 1000 transmitted from the mobile terminal to the base station. The uplink control signal has a destination base station number field 1001, a mobile terminal ID number field 1002 for storing the terminal ID number from which the data is transmitted, a request field 1003 for storing a request such as a connection request transmitted to the destination base station, and a propagation path information field 1004. The mobile terminal stores, as the destination base station number, the base station number acquired from the downlink control signal. The mobile terminal stores the terminal ID number thereof. The mobile terminal also stores, as a request, a connection or disconnection request given to the base station. The request is expressed as, for example, a connection request (10), a disconnection request (01) or no request (00). The value stored in the fourth field is derived from the receiving SINR measured at the mobile terminal and an index value of an integer as indicated by the propagation path condition in FIG. 6. The index value is modulated by the propagation path information generating unit 208 and stored as a symbol series in the propagation path information field 1004. These information are multiplexed by code division. In addition, the mobile terminal integrates a different PN code for each mobile terminal to specify the mobile terminal constituting an information source, and transmits the code division multiplexed information to the base station through the control channel. The base station multiplies the PN code corresponding to each mobile terminal to the received signal and thereby retrieves the uplink control signal for a specified mobile terminal.

Figure 11:
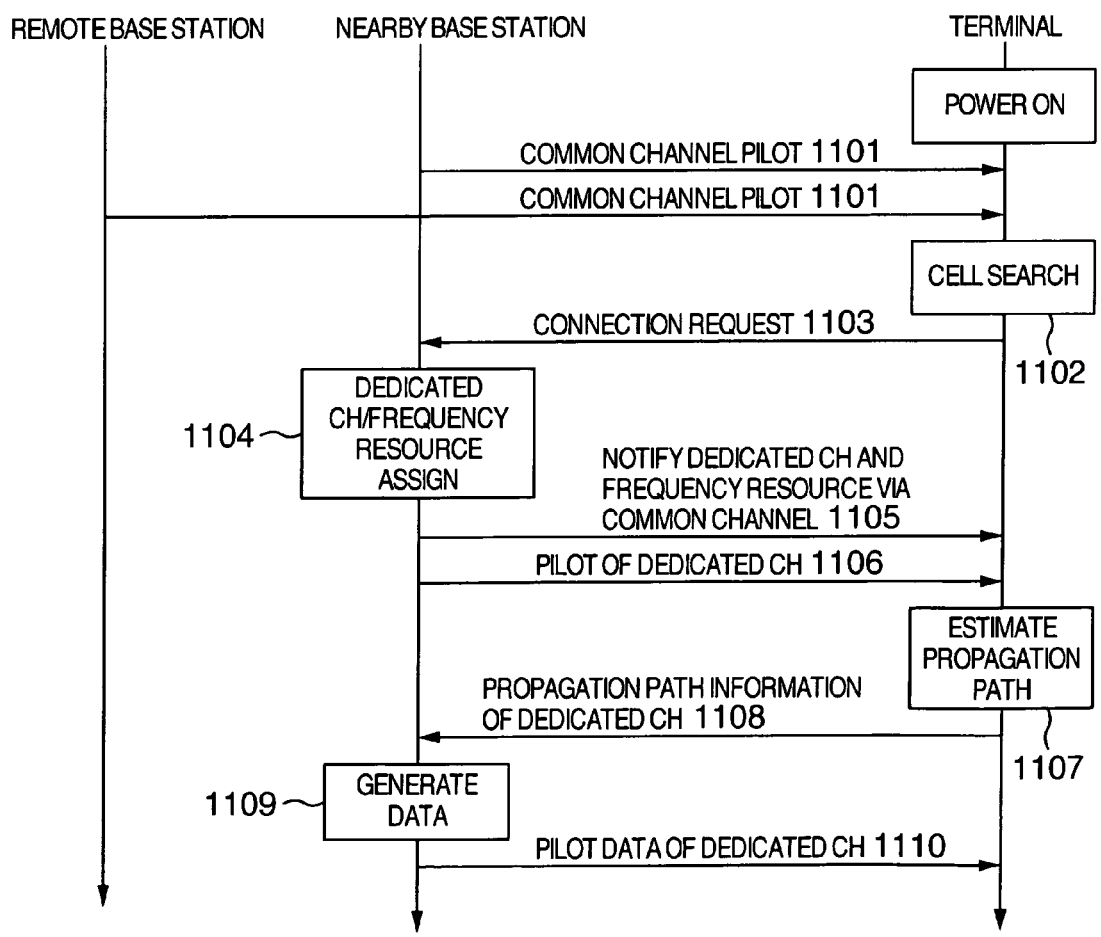
FIG. 11 is a sequence diagram showing an example of the operation for establishing the connection between a base station and a mobile terminal.

FIG. 11 is a sequence diagram showing an example of the-operation of establishing connection between the base station and the mobile terminal. Once the mobile terminal is supplied with power, the mobile terminal tries to receive the pilot signal 1101 of the common channel arriving from a plurality of base stations. Next, the mobile terminal tries to conduct the cell search of the received common pilot signal, and searching for the base station having the largest reception power (1102), transmits the connection request 1103 to the base station having the largest receiving power through the uplink control channel. In this case, the reception power of pilot signals from neighboring base stations is observed as a higher value than the reception power from remote base stations, so that a connection request is transmitted to a neighboring base station. The base station, upon receipt of the connection request, assigns the dedicated channel to the mobile terminal, and also assigns the frequency resource with the result of estimation of the arrival direction of the uplink signal (1104). The base station transmits the information on the assigned dedicated channel and the frequency resource through the common channel using the control signal shown in FIG. 9 (1105). The base station also transmits the pilot signal (1106) of the dedicated channel. The mobile terminal reads the dedicated channel number and the frequency resource information from the common channel, and estimates the SINR of the propagation path of the dedicated pilot signal (1107). The propagation path information containing the SINR expressed by the index value is notified to the base station (1108). The base station generates a downlink data packet (1109), and transmits by multiplexing the pilot signal and the data signal in the dedicated channel (1110).

When the power of the base station is turned on, only the common channel is first used for transmission, and upon receipt of a connection request from the mobile terminal by the control signal shown in FIG. 10, the dedicated channel and the frequency resource are assigned. Then, the information on the dedicated channel and the frequency resource are transmitted by the control signal shown in FIG. 9, while at the same time starting the transmission through the dedicated channel.

Figure 12:
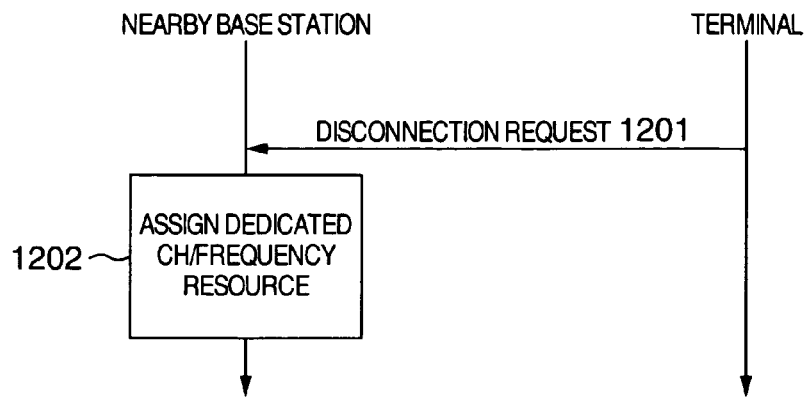
FIG. 12 is a sequence diagram showing an example of the operation for disconnecting a base station and a mobile terminal.

FIG. 12 is a sequence diagram showing an example of the disconnecting operation between a base station and a mobile terminal. The mobile terminal transmits a disconnection request 1201 to the base station with a hand-off or the like as a trigger. The base station cancels, through the dedicated channel and the frequency resource assign process 1202, the assignment of the frequency resource and the dedicated channel for the mobile terminal which has issued a disconnection request. The operation flow for the mobile terminal issuing a disconnection request is described above. The base station, which issues a disconnection request, cancels the assignment of the dedicated channel and the frequency resource and notifies the particular mobile terminal of the disconnection. For implementing this notification, however, a notification field (indicating the terminal number and the change in connected state) is required to be added to the downlink control signal shown in FIG. 10.

The foregoing description has dealt with an embodiment on the assumption each mobile terminal continues communication in the dedicated channel (code resource) assigned at the time of connection or starting the communication on the system defined in FIGS. 1 and 2. A system is explained below, on the other hand, in which the frequency resources including the time resource, the space resource and the code resource are adaptively combined for each mobile terminal, so that the optimum multiplexing scheme can be used at each particular time point. The base station and the mobile terminal can be configured the same way as shown in FIGS. 4 and 8.

The frequency resource is changed for the purpose of avoiding the conflict between the downlink signals of the mobile terminals. The time and code resources assigned, as long as different for a different mobile terminal, never come into conflict with each other. The space resource, on the other hand, can come into conflict due to the movement of the mobile terminals. In the case where the same time-code resource is used for a plurality of space resources, however, the number of channels with which the base station can transmit the data at the same time is increased, thereby improving the throughput of the cell. The base station, therefore, desirably utilizes the space resource as much as possible. In other words, the base station can improve the cell throughput by adopting the resource assignment policy described below.

Mobile terminals with a large angle between them as viewed from the base station (low in spatial correlation) are assigned the same time-code resource.

Mobile terminals with a small angle between them as viewed from the base station (high in spatial correlation) are assigned different time-code resources. (i.e. at least either the time resource or the code resource is different.)

By this adaptive control operation, a high cell throughput is obtained.

A method for assigning the frequency resource adaptively is described already in the embodiment shown in FIGS. 3 to 10. The base station assigns the frequency resource to each mobile terminal by slot and broadcasts, with the downlink control signal through the common channel, the information including the frequency resource and the mobile terminals using each dedicated channel. Even in the case where the frequency source is switched by the base station, therefore, the mobile terminal can follow a new transmission system (multiplexing scheme) based on the information transmitted through the common channel.

Whether or not the transmission signals to the mobile terminals can be separated by the space resource depends on the direction to each mobile terminal as viewed from the base station. According to the resource assignment policy described above, the frequency resource adaptively switched are the time and code resources. The base station detects, at all times, the direction in which the signal arrives from each mobile terminal and the terminal position (direction) information notified from each mobile terminal, and switches the space resource by slot in accordance with the directions of the mobile terminals detected. In the case where the transmission signal to each mobile terminals cannot be separated simply by space division multiplexing with the space resource assigned to the mobile terminal, the base station further assigns different time resources or different code resources for different mobile terminals for transmission through the dedicated channel by time division multiplexing or code division multiplexing, as the case may be.

The wording "in accordance with the directions of the mobile terminals" is indicative of either the fact that the beams following the directions of the mobile terminals are produced as required or the fact that a fixed beam nearest to the directions of the mobile terminals is selected. The former is explained above in the embodiment shown in FIGS. 3 to 10. In the latter method, the directivity pattern output from the base station is fixed, and a fixed directivity patterns is selected with the movement of the mobile terminal. In any case, the base station is required to switch the time-code resource adaptively. The fixed beam described above is selected by the base station. Specifically, the direction in which the uplink signal arrives from a mobile terminal is estimated, a beam including a main beam having the directivity gain near to the arrival direction is selected, and the particular fixed beam (space resource) is reassigned by the resource assignment means 134 shown in FIG. 4. The base station, when using the fixed beam, assigns a different Walsh code for each fixed beam, and regarding that the fixed beam equivalent the dedicated channel, time-division-multiplexes the signals for the mobile terminal associated with the dedicated channel. In the case where the fixed beam is regarded as equivalent to the dedicated channel, the assignment of the dedicated channel for the mobile terminal is changed according to the direction as viewed from the base station. This method is so simple that once the direction of the mobile terminal from the base station is determined, the space/code resource assigned to a mobile terminal is uniquely determined and the time resource is used for time division multiplexing the signal for the mobile terminal associated with the dedicated channel. This method thus conforms with the assignment policy described above. In other words, the use of the fixed beam by the base station effectively simplifies the channel assignment.

Figure 13:
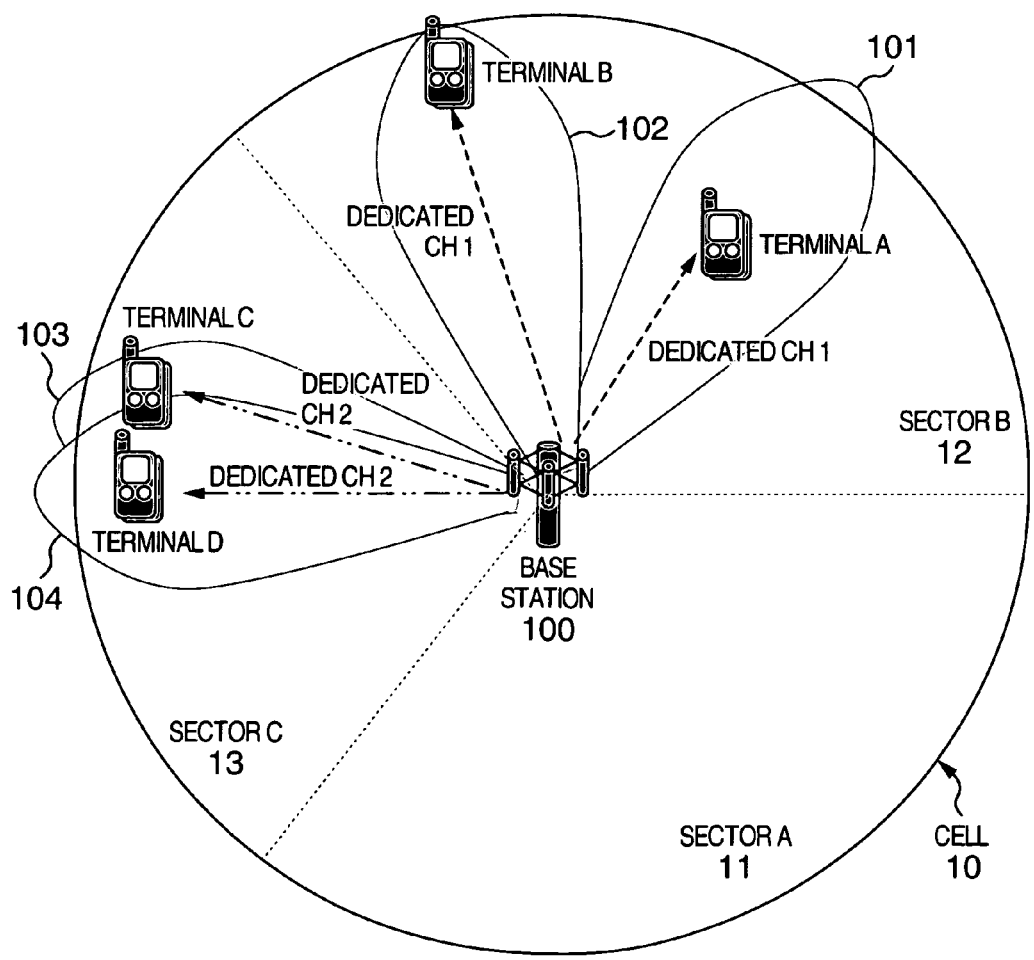
FIG. 13 is a diagram showing a network configuration of an example of a communication system between a base station and mobile terminals.

FIG. 13 shows a network configuration according to an example of a communication system between a base station and mobile terminals. The difference from FIG. 1 lies in that the direction of the directivity gain 102, 103 for directing the beam to each mobile terminal is changed with the movement of the mobile terminals B and C. The dedicated channel assigned to each mobile terminal remains the same as at the time of connection or communication start. In the case where the cell 10 is divided into sectors 11, 12, 13 and a mobile terminal moves into a new sector, however, the mobile terminal issues a disconnection request to the old sector as shown in FIG. 12 and a connection request to a new sector as shown in FIG. 11. In FIG. 13, the mobile terminal C moves from the sector 12 to the sector 13. Therefore, the mobile terminal C issues a disconnection request to the sector 12, and a connection request to the sector 13. This switching is accomplished by the mobile terminal issuing a disconnection request and a connection request when the pilot signal receiving power becomes larger for the new sector.

Now, an explanation is given about the operation for rewriting each table to reassign the frequency resource with the movement of a mobile terminal. First, the base station estimates, through the arrival direction estimation unit 143, the directions in which the uplink signals transmitted from the mobile terminals A, B, C, D arrive. The result of estimation is assumed to be 69 degrees, 105 degrees, 176 degrees and 180 degrees from a certain reference direction for the mobile terminals A, B, C and D, respectively, as shown in FIG. 13. The base station prohibits the assignment of the same time-code resource to the mobile terminals approaching to each other at an angle of five degrees or less in the direction as viewed from the base station. This determination is made in the space resource conflict determining unit 134 shown in FIG. 4, and the result of determination is recorded in the same time-code assignment prohibition tables of FIG. 14. FIG. 14A shows the same time-code assignment prohibition table for the terminal arrangement shown in FIG. 1, and FIG. 14B the table for the terminal arrangement shown in FIG. 13. FIG. 13, as compared with FIG. 1, shows the case in which the angular difference between the mobile terminals A, B, C is increased by the movement of the mobile terminals B, C, while the angle between the mobile terminals C, D is decreased. The change from FIG. 14A to FIG. 14B reflects this situation.

This-result causes the downlink signals of the mobile terminals C and D to come to interfere with each other. As a result, the receiving SINR of the mobile terminals C, D is reduced, thereby reducing the index of the propagation path condition notified by the mobile terminals C, D to the base station. With regard to the mobile terminals A, B, on the other hand, the interference decreases due to the increased angle between them, and so does the interference from the mobile terminal C. Thus, the receiving SINR of the mobile terminals A, B is improved, thereby increasing the index of the propagation path condition notified from the mobile terminals A, B to the base station. FIG. 15A is a propagation path information recording table reflecting the terminal arrangement of FIG. 1, and FIG. 15B the same table reflecting the terminal arrangement of FIG. 13. The change from FIG. 15A to FIG. 15B indicates the change in the relative positions of the mobile terminals.

FIG. 16A is a resource assign table reflecting the mobile terminal arrangement shown in FIG. 1, and FIG. 16B the same table reflecting the terminal arrangement shown in FIG. 13. The dedicated channel ID (112-2) and the code resource (112-4) remain unchanged in spite of the change in mobile terminal arrangement. In the case where a mobile terminal moves between cells or the sectors, however, a disconnection request is issued to the cell or sector from which the mobile terminal has moved, and therefore the base station that has received the disconnection request deletes the information of the particular mobile terminal from the resource assign table. The space resource (112-5) reflects the estimation by the arrival direction estimation unit 143 shown in FIG. 4. In the case where the time resource is assigned for the terminal arrangement shown in FIG. 13, the base station sets the operation in such a manner that the mobile terminals A, B which use the same code resource but are spatially distant can transmit the data with all the slots, while the mobile terminals C, D which use the same code resource but spatially near to each other transmit the data alternately with each other.

FIG. 17 is an operation flowchart showing an example of the frequency resource assignment by the base station in accordance with the assignment policy described above. As explained above, the frequency resource is reassigned using the resource assign table 112, the same time-code assignment prohibition table 132 and the propagation path information recording table 136 that were rewritten as described above. The space resource is assigned by employing either a method in which the directivity pattern follows the direction of the mobile terminal as required or a method in which a fixed directivity pattern is selected. Then, a method is explained for switching the time-code resource adaptively. The base station executes the operation flow-for all the combinations of two mobile terminals in the cell for each slot to switch the frequency resource.

First, the base station determines whether the space resources of the two mobile terminals i, j conflict with each other (1301). This determination is made by the spatial correlation calculation unit 141 or the arrival direction estimation unit 143 and the space resource conflict determining unit 131 shown in FIG. 4. An example of conflict determination is explained with reference to the embodiment shown in FIG. 4.

In the case where a conflict occurs between the space resources, the base station confirms from the resource assign table 112 whether the same time-code resource is used or not (1302), and in the case where the same time-code resource is not used, holds the same assignment (1305), while in the case where the same time-code resource is used, the code or the time resource of the mobile terminal i or j is shifted. The base station then checks whether an extra code resource is available or not (1303), and if available, an unused code resource, is assigned to the mobile terminal i or j (1304). Otherwise, the code resource that has already been assigned to other mobile terminals is reassigned to the mobile terminal i or j. In this way, the transmission slots for the mobile terminals using the same code resource are limited and coordinated (1306). In the case where no conflict occurs between the space resources of the two mobile terminals i, j, on the other hand, the base station determines whether the time-code resources of the mobile terminals are identical or not and in the case where they are different, unifies the time-code resources and thus employs the same time-code resource for the mobile terminals i and j (1307 to 1309).

Finally, a method of switching the multiplexing scheme is explained. This invention supports seven multiplexing schemes including the time division multiplexing, the space division multiplexing, the code division multiplexing and the combinations of two or all of these multiplex schemes, which are switched by the base station. Which of the space division multiplexing schemes are to be optimally combined depends on the total number of mobile terminals requesting communication with the base station and the direction of each mobile terminal as viewed from the base station.

In the resource assign table shown in FIG. 7, the frequency resource of each mobile terminal is indicated three domains of time, space and code. In the case where the base station employs the same resource of a given domain for all the mobile terminals, the multiplexing in the particular domain is not carried out. In the case where the base station assigns the same code resource to all the mobile terminals, for example, the dedicated channels use the same code resource, thereby making it possible to create a situation where the code division multiplexing is substantially impossible. It is impossible to employ exactly the same space resource due to the difference of the direction of the mobile terminals as viewed from the base station. Thus, the omni-directional radiation is used for unification. In this case, an indicator of the omni-directional radiation has to be added to the space resource record.

The resource assign table is created by the resource assignment means 134 of FIG. 4, which executes the switching of the multiplexing scheme.

The points taken into account in determining the method of switching the multiplexing scheme are (1) Trigger for starting time division multiplexing
(2) Trigger for stopping time division multiplexing
(3) Trigger for starting space division multiplexing
(4) Trigger for stopping space division multiplexing
(5) Trigger for starting code division multiplexing
(6) Trigger for stopping code division multiplexing By combining these triggers, any of the seven multiplexing schemes can be switched. Each point is described below.

The point (1), as described in the embodiment of FIG. 17, concerns the time point when the base station confirms that the multiplexing by space division or code division is impossible, i.e. the time point when the space resources conflict with each other and the code not common for by the conflicting mobile terminals cannot be secured. In the case where the code division multiplexing is not conducted, the time point is when the space resources conflict with each other. Always in the case where space- and code division multiplexing is impossible, the separation is possible only in time domain. Thus, the time division multiplexing is employed. The point (2), on the other hand, concerns the time point when the base station confirms that the separation is possible in space and code domains. The priority of the time division multiplexing is lowest. Although the independence is maintained between the time division channels, the transmission capacity of each division channel is reduced by the degree of division. Therefore, the priority of time division multiplexing is reduced below that of the space or code division multiplexing. Thus, the time division multiplexing is used as the last resort.

The point (3) concerns the time point when the angular difference between the mobile terminals exceeds a threshold value (e.g. 5 degrees) or the spatial correlation value between the mobile terminals is lower than a threshold value (say, 0.90). The point (4) is associated with the time point when the angular difference is reduced below the threshold value or the spatial correlation value exceeds the threshold value. The space division multiplexing is higher in priority than the time or code division multiplexing. The code division multiplexing makes it more difficult to secure a sufficient spreading factor in code domain with the increase in data rate. Thus, the independence between the code channels is deteriorated. In contrast, the data rate, is not dependent on the space division multiplexing and therefore, the independence is maintained as long as the mobile terminals spatially separated. In the case where this situation changes, the priority order of the multiplexing schemes is changed.

The point (5) is associated with the time point when the base station confirms that the space resource cannot be secured. In the case where the space division multiplexing is not carried out, the multiplexing by code or time division is employed. Since the priority of the time resource assignment is lowest, however, the base station starts with the code division multiplexing. In the point (6), in contrast, the time point is when the base station confirms that different space resources can be secured for different mobile terminals It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A signal transmission method for a radio base station in a communication system for controlling transmission of a data signal to each mobile terminal from said radio base station in accordance with a condition of said mobile terminal to receive a pilot signal transmitted from said radio base station to said mobile terminal, wherein based on a control signal received from said mobile terminal, at least an appropriate one of a plurality of signal multiplexing schemes is selected, and transmission signals to each said mobile terminal are multiplexed by said selected signal multiplexing scheme, wherein each of said transmission signal includes a dedicated pilot signal and a data signal transmitted to said mobile terminal, wherein the plurality of signal multiplexing schemes includes space division multiplexing, time division multiplexing, and code division multiplexing, and wherein the space division multiplexing is higher in priority than the time division multiplexing or the code division multiplexing, wherein said selected signal multiplexing scheme includes at least the space division multiplexing, said selected signal multiplexing scheme being selected based on selected one of a direction of each of said plurality of said mobile terminals with respect to said base station and a spatial correlation between said mobile terminals, and wherein said selected signal multiplexing scheme includes the time division multiplexing, and said signal transmission method comprises the steps of:

determining a relation between the directions of said plurality of said mobile terminals;

determining separability of the transmission signals to said plurality of said mobile terminals in a space domain based on said relation of their directions; and selecting the time division multiplexing and the space division multiplexing in the case where an angular difference between the mobile terminals in view from the base station exceeds a threshold value or a spatial correlation value between the mobile terminals is lower than a threshold value.

2. A signal transmission method according to claim 1, wherein said mobile terminal receives a dedicated pilot signal assigned to said mobile terminal, and generates said control signal based on said dedicated pilot signal.

3. A signal transmission method according to claim 1, wherein said signal multiplexing scheme is selected from the code division multiplexing, the time division multiplexing, the space division multiplexing and any one of a plurality of combinations of said code division multiplexing, said time division multiplexing and said space division multiplexing.

4. A base station in a communication system for controlling transmission of a data signal to each mobile terminal from said base station in accordance with a condition of a propagation path between said base station and said each mobile terminal, comprising:

a transmission signal multiplexing unit for multiplexing a plurality of transmission signals transmitted to said mobile terminal;

a transmission unit for transmitting said plurality of multiplexed transmission signals;

a receiving unit for receiving a control signal transmitted from said mobile terminal; and a multiplexing scheme determining unit for determining a multiplexing scheme of said plurality of the transmission signals based on a control signal received from said mobile terminal;

a space division multiplexing unit for multiplexing at least a plurality of transmission signals in a space domain, and a mobile terminal direction determining unit for determining a direction of the mobile terminal to which each of said transmission signals is transmitted; and an array antenna including a plurality of antennas for transmitting and receiving the signals to and from said mobile terminal, wherein each of said transmission signals includes a data signal and a dedicated pilot signal transmitted using a dedicated channel to said each mobile terminal, wherein said multiplexing scheme is selected from a plurality of signal multiplexing schemes, said plurality of signal multiplexing schemes include space division multiplexing, time division multiplexing, and code division multiplexing, and the space division multiplexing is higher in priority than the time division multiplexing or the code division multiplexing, wherein it is determined whether the transmission signals to said plurality of said mobile terminals are to be multiplexed by said space division multiplexing unit based on the directions of said plurality of said mobile terminals determined by said mobile terminal direction determining unit, and wherein said space division multiplexing unit determines an array weight of said array antenna for each of said plurality of said mobile terminals and carries out a beam-forming operation using said array weight.

5. A base station according to claim 4, wherein said transmission unit transmits information on said determined multiplexing scheme to said mobile terminal.

6. A base station according to claim 5, wherein said information on the multiplexing scheme is transmitted using a common channel.

7. A base station according to claim 4, wherein said control signal is produced based on the dedicated pilot signal of a dedicated channel assigned to said mobile terminal and received by said mobile terminal.

8. A base station according to claim 4, wherein said multiplexing scheme is selected from the code division multiplexing, the time division multiplexing, the space division multiplexing and any one of a plurality of combinations of said code division multiplexing, said time division multiplexing and said space division multiplexing.

9. A base station according to claim 4, wherein the multiplexing scheme is determined based on downlink propagation path information received from said mobile terminal.

10. A mobile terminal in a communication system for controlling a multiplexing scheme of the signal transmitted to each mobile terminal from a base station in accordance with a condition of a propagation path between said base station and said each mobile terminal, comprising:

received signal separation unit for separating the signal transmitted to said mobile terminal from the signal multiplexed and transmitted by said base station; and a separation method determining unit for determining a separation method of separating the signal received from said base station;

wherein said receiving signal separation unit separates the signal transmitted to said mobile terminal, based on the said separation method determined by said separation method determining unit, wherein said signal transmitted to said mobile terminal includes a data signal and a dedicated pilot signal to be transmitted to said mobile terminal, and wherein said multiplexing scheme is selected from a plurality of signal multiplexing schemes, the plurality of signal multiplexing schemes includes space division multiplexing, time division multiplexing, and code division multiplexing, and wherein the space division multiplexing is higher in priority than the time division multiplexing or the code division multiplexing, wherein said selected signal multiplexing scheme is selected based on selected one of a direction of each of said plurality of said mobile terminals with respect to said base station and a spatial correlation between said mobile terminals, and wherein the signal is transmitted from said base station to mobile terminal by determining a relation between the directions of said plurality of said mobile terminals, determining separability of the transmission signals to said plurality of said mobile terminals in a space domain based on said relation of their directions, and selecting the time division multiplexing and the space division multiplexing in the case where an angular difference between the mobile terminals in view from the base station exceeds a threshold value or a spatial correlation value between the mobile terminals is lower than a threshold value.

11. A mobile terminal according to claim 10, wherein said multiplexing scheme is selected from the code division multiplexing, the time division multiplexing, the space division multiplexing and any one of a plurality of combinations of said code division multiplexing, said time division multiplexing and said space division multiplexing.

12. A mobile terminal according to claim 10, wherein said separation method determining unit determines said separation method based on multiplexing scheme information received from said base station.

13. A mobile terminal according to claim 12, wherein said multiplexing scheme information is transmitted through a common channel from said base station.

14. A mobile terminal according to claim 10, wherein said propagation path information is generated based on a receiving condition of said dedicated pilot signal received from said base station, and transmitted to said base station.

* * * * *